(12) United States Patent
Kataoka et al.

(10) Patent No.: US 11,005,142 B2
(45) Date of Patent: May 11, 2021

(54) BUSBAR MODULE AND BATTERY PACK

(71) Applicant: Yazaki Corporation, Tokyo (JP)

(72) Inventors: Ryota Kataoka, Shizuoka (JP); Hirokuni Koike, Shizuoka (JP); Hideki Inoue, Shizuoka (JP); Takao Shoji, Shizuoka (JP); Katsunori Sato, Shizuoka (JP); Yutaro Okazaki, Shizuoka (JP)

(73) Assignee: YAZAKI CORPORATION, Tokyo (JP)

( * ) Notice: Subject to any disclaimer, the term of this patent is extended or adjusted under 35 U.S.C. 154(b) by 206 days.

(21) Appl. No.: 16/229,441

(22) Filed: Dec. 21, 2018

(65) Prior Publication Data

US 2019/0123334 A1 Apr. 25, 2019

Related U.S. Application Data

(63) Continuation of application No. PCT/JP2017/013946, filed on Apr. 3, 2017.

(30) Foreign Application Priority Data

Jul. 26, 2016 (JP) .............................. JP2016-146601

(51) Int. Cl.
*H01M 50/502* (2021.01)
*H01M 50/20* (2021.01)
*H01M 50/50* (2021.01)

(52) U.S. Cl.
CPC ......... *H01M 50/502* (2021.01); *H01M 50/20* (2021.01); *H01M 50/50* (2021.01); *H01M 2220/20* (2013.01)

(58) Field of Classification Search
None
See application file for complete search history.

(56) References Cited

U.S. PATENT DOCUMENTS

| 6,261,719 B1 | 7/2001 | Ikeda et al. |
| 2012/0328920 A1 | 12/2012 | Takase et al. |
| 2017/0352859 A1 | 12/2017 | Okamoto |

FOREIGN PATENT DOCUMENTS

| JP | 2000-149909 A | 5/2000 |
| JP | 2011-210710 A | 10/2011 |
| JP | 2016-018741 A | 2/2016 |
| JP | 2016-115616 A | 6/2016 |
| WO | 2012/053581 A1 | 4/2012 |
| WO | 2013/061871 A1 | 5/2013 |

OTHER PUBLICATIONS

International Search Report for PCT/JP2017/013946 dated May 16, 2017 (PCT/ISA/210).

*Primary Examiner* — Sarah A. Slifka
(74) *Attorney, Agent, or Firm* — Sughrue Mion, PLLC

(57) ABSTRACT

A busbar module includes a basic busbar module assembled to an electrode terminal group arranged in a row of a battery module formed of a plurality of battery cells, and a holding member that holds the basic busbar module. The basic busbar module includes a plurality of busbars that is arranged along an arrangement direction of respective electrode terminals of the electrode terminal group and is electrically connected to the corresponding electrode terminals, and flat cable having a conductor portion that is electrically connected to the plurality of busbars, and an insulating holding portion that holds the plurality of busbars, and the holding member has a holding body that holds the basic busbar module.

11 Claims, 18 Drawing Sheets

BUSBAR MODULE AND BATTERY PACK

CROSS-REFERENCE TO RELATED APPLICATION

This application is a continuation application of International Application PCT/JP2017/013946, filed on Apr. 3, 2017, and designating the U.S., the entire contents of which are incorporated herein by reference.

BACKGROUND OF THE INVENTION

1. Field of the Invention

The present invention relates to a busbar module and a battery pack.

2. Description of the Related Art

Conventionally, in an electric car or a hybrid vehicle, a battery module in which a large number of battery cells are arranged and connected in series or in parallel is mounted from the viewpoint of output, cruising distance, and the like. In the battery module, in a state in which electrode terminals of the respective battery cells on one side are arranged in a row and electrode terminals on the other side are also arranged in a row, the battery cells are arranged in a line. The battery module is accommodated in a housing provided with an accommodation chamber for each battery cell, and forms a battery pack together with a busbar module and the like. For example, the busbar module is provided for each electrode terminal group arranged in a row, and includes at least a plurality of busbars that electrically connect the electrode terminals of the adjacent battery cells, and linear conductors which are electrically connected to the busbars and are each provided for the plurality of busbars. A through-hole through which the electrode terminal is inserted is formed in the busbar. The respective linear conductors are aligned in the axial direction thereof and are arranged side by side in a direction perpendicular to the axial direction to constitute a flat cable integrated by being covered with a covering portion having flexibility. The respective busbars are integrated with the covering portion. This type of busbar module and this type of battery pack are disclosed in, for example, Japanese Patent Application Laid-open No. 2011-210710.

However, in the busbar module, since the flat cable holding the busbars has flexibility, there is a possibility that the flat cable may partially sag when the busbar module is assembled to the battery module. Therefore, assembly work is performed in consideration of the sagging.

SUMMARY OF THE INVENTION

In this regard, an object of the present invention is to provide a busbar module and a battery pack capable of improving assembly workability to a battery module.

In order to achieve the above mentioned object, a busbar module according to one aspect of the present invention includes a basic busbar module assembled to an electrode terminal group arranged in a row of a battery module formed of a plurality of battery cells; and a holding member that holds the basic busbar module, wherein the basic busbar module includes: a plurality of busbars that is arranged along an arrangement direction of respective electrode terminals of the electrode terminal group and is electrically connected to the corresponding electrode terminals; and a flexible flat conductor having a conductor portion that is electrically connected to the plurality of busbars, and an insulating holding portion that holds the plurality of busbars, the holding member has a holding body that holds the basic busbar module for each of the plurality of busbars, each of the holding bodies is arranged side by side in an arrangement direction of the busbars, the holding body has an insertion portion into which the busbar is inserted, and a holding portion that is engaged with the busbar during an insertion into the insertion portion and holds the busbar, the insertion portion is provided at each of both ends in the arrangement direction of the holding bodies, each of the insertion portions is formed such that two corner portions in the arrangement direction of the busbar are respectively inserted into the insertion portions, and the holding portion of the holding body has a claw portion that is inserted into a locking hole of the busbar during an insertion of the busbar into the insertion portion.

According to another aspect of the present invention, in the busbar module, it is desirable that the holding member has an insulating cover body that covers the busbar on the battery module after being assembled to the battery module together with the basic busbar module.

According to still another aspect of the present invention, in the busbar module, it is desirable that the holding member has a hinge portion between the holding body and the insulating cover body, and the hinge portion is formed to change a position of the insulating cover body with respect to the holding body between a position where work of connection between the busbar and the electrode terminal is not impeded and a position where the busbar on the battery module is covered.

According to still another aspect of the present invention, in the busbar module, it is desirable that the holding member is provided with a lock mechanism that holds a closed state of the insulating cover body with respect to the holding body capable of covering the busbar on the battery module, and the lock mechanism includes a first locking portion provided on the holding body side, and a second locking portion that is provided on the insulating cover body side and holds the closed state by being locked to the first locking portion.

According to still another aspect of the present invention, in the busbar module, it is desirable that the basic busbar module is provided for each of sections of the electrode terminal group, and in the holding member, the holding body is formed to collectively hold a plurality of the basic busbar modules.

Further, in order to achieve the above mentioned object, a battery pack according to still another aspect of the present invention includes a battery module including a plurality of battery cells; and a busbar module that electrically connects the plurality of battery cells in series or in parallel, wherein the busbar module includes a basic busbar module assembled to an electrode terminal group arranged in a row of the battery module, and a holding member that holds the basic busbar module, the basic busbar module includes: a plurality of busbars that is arranged along an arrangement direction of respective electrode terminals of the electrode terminal group and is electrically connected to the corresponding electrode terminals; and a flexible flat conductor having a conductor portion that is electrically connected to the plurality of busbars, and an insulating holding portion that holds the plurality of busbars, the holding member has a holding body that holds the basic busbar module for each of the plurality of busbars, each of the holding bodies is arranged side by side in an arrangement direction of the busbars, the holding body has an insertion portion into which the busbar is inserted, and a holding portion that is engaged with the busbar during an insertion into the insertion portion and holds the busbar, the insertion portion is provided at each of both ends in the arrangement direction of the holding bodies, each of the insertion portions is formed such that two corner portions in the arrangement direction of the busbar are respectively inserted into the insertion portions, and the holding portion of the holding body has a claw portion that is inserted into a locking hole of the busbar during an insertion of the busbar into the insertion portion.

The above and other objects, features, advantages and technical and industrial significance of this invention will be better understood by reading the following detailed description of presently preferred embodiments of the invention, when considered in connection with the accompanying drawings.

DETAILED DESCRIPTION OF THE PREFERRED EMBODIMENTS

Figure 1:
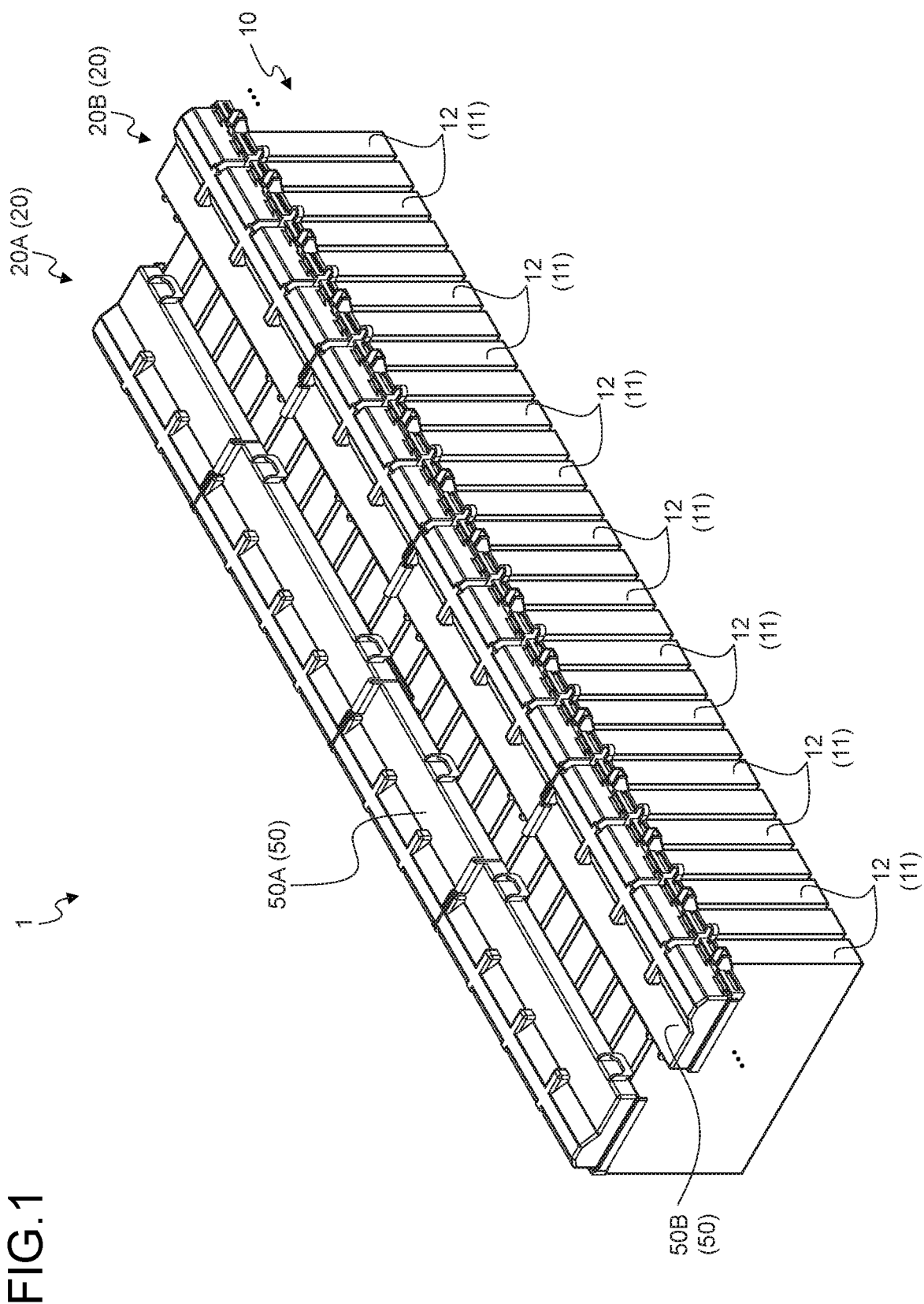
FIG. 1 is a perspective view illustrating a battery pack of an embodiment.

Hereinafter, embodiments of a busbar module and a battery pack according to the present invention will be described in detail with reference to the drawings. Incidentally, the invention is not limited by these embodiments.

Embodiment

An embodiment of the busbar module and the battery pack according to the present invention will be described with reference to FIGS. 1 to 11.

Reference numeral 1 in FIGS. 1 to 4 denotes a battery pack of this embodiment. Reference numeral 10 denotes a battery module of the battery pack 1. Reference numeral 20 denotes a busbar module of the battery pack 1.

The battery pack 1 is mounted on a vehicle such as an electric car or a hybrid vehicle, and includes a battery module 10 and a busbar module 20. The battery module 10 is an assembly of a plurality of battery cells 11. The busbar module 20 is formed by integrating a plurality of basic busbar modules 21 (FIGS. 5 and 6), and electrically connects the plurality of battery cells 11 of the battery module 10 in series or in parallel. The basic busbar module 21 is an assembly of a plurality of busbars 30 and a flexible flat conductor 40 (FIGS. 6 and 7). In the battery pack 1, the battery module 10 is accommodated in a housing provided with an accommodation chamber for each battery cell 11. In this embodiment, illustration of the housing is omitted for convenience.

The battery cell 11 includes two electrode terminals 13 at one end of a cell body 12. For example, in the illustrated battery cell 11, the cell body 12 forms a rectangular parallelepiped, and each of the electrode terminals 13 is provided on one of the faces. In this example, the face on which the electrode terminals 13 are provided faces upward of the vehicle. In the battery cell 11, two stud bolts are vertically provided at both ends of the face in the longitudinal direction, and the stud bolts are respectively used as the electrode terminals 13. Therefore, each of the electrode terminals 13 extends in a direction perpendicular to the face. One of the electrode terminals 13 is a positive electrode and the other is a negative electrode.

Figure 2:
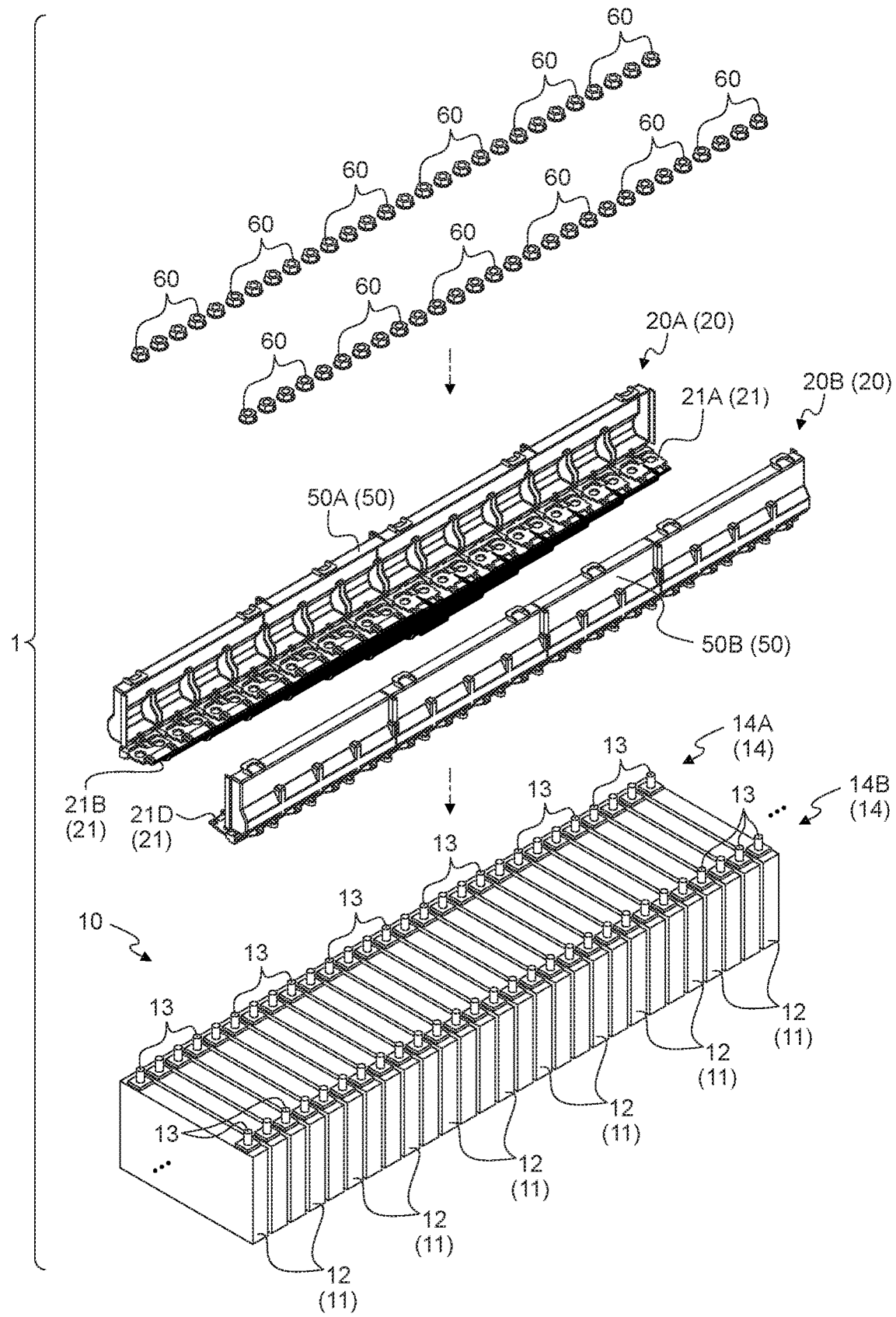
FIG. 2 is an exploded perspective view of the battery pack of the embodiment.
Figure 3:
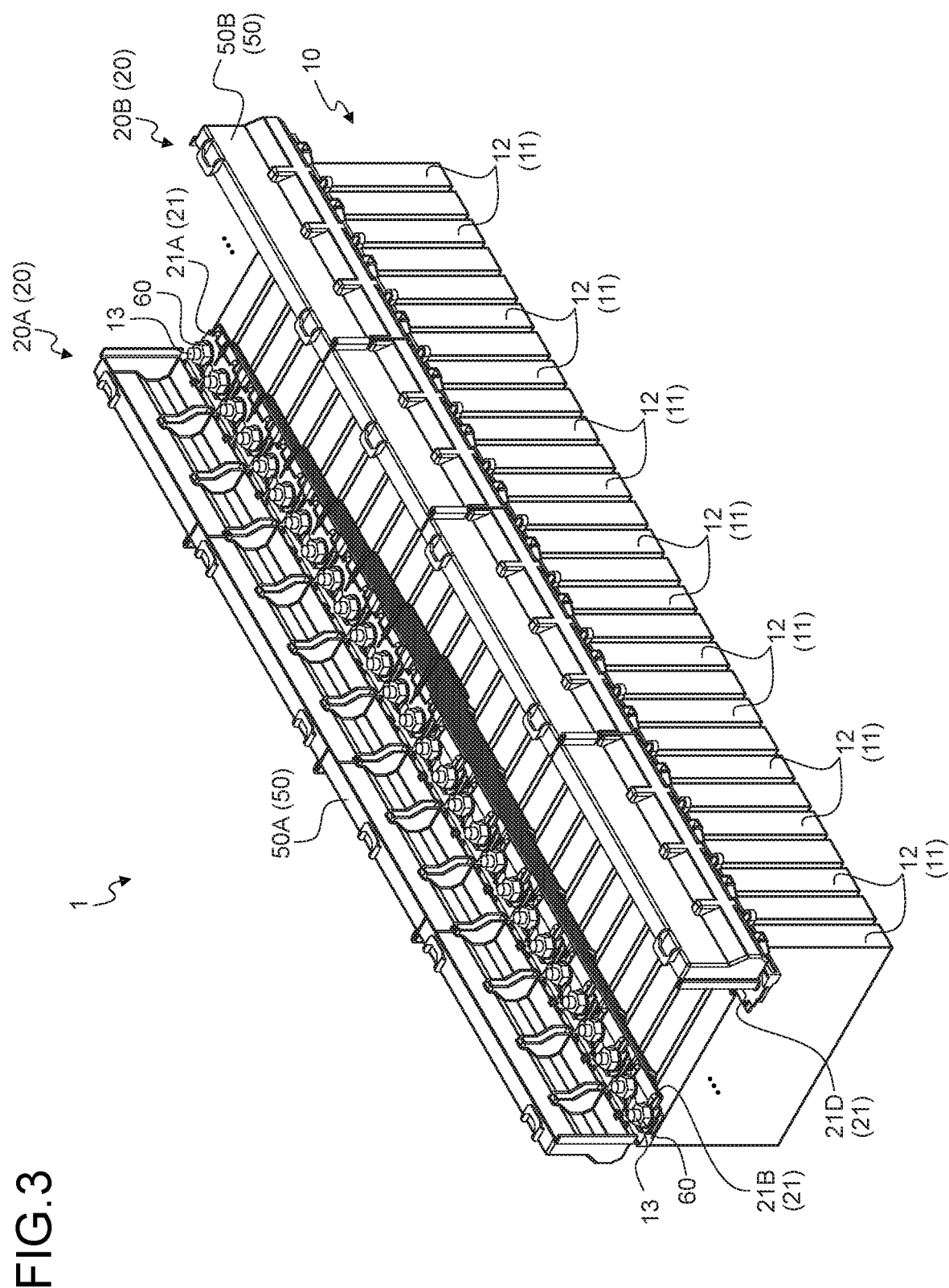
FIG. 3 is a perspective view illustrating the battery pack before an insulating cover body is closed.
Figure 4:
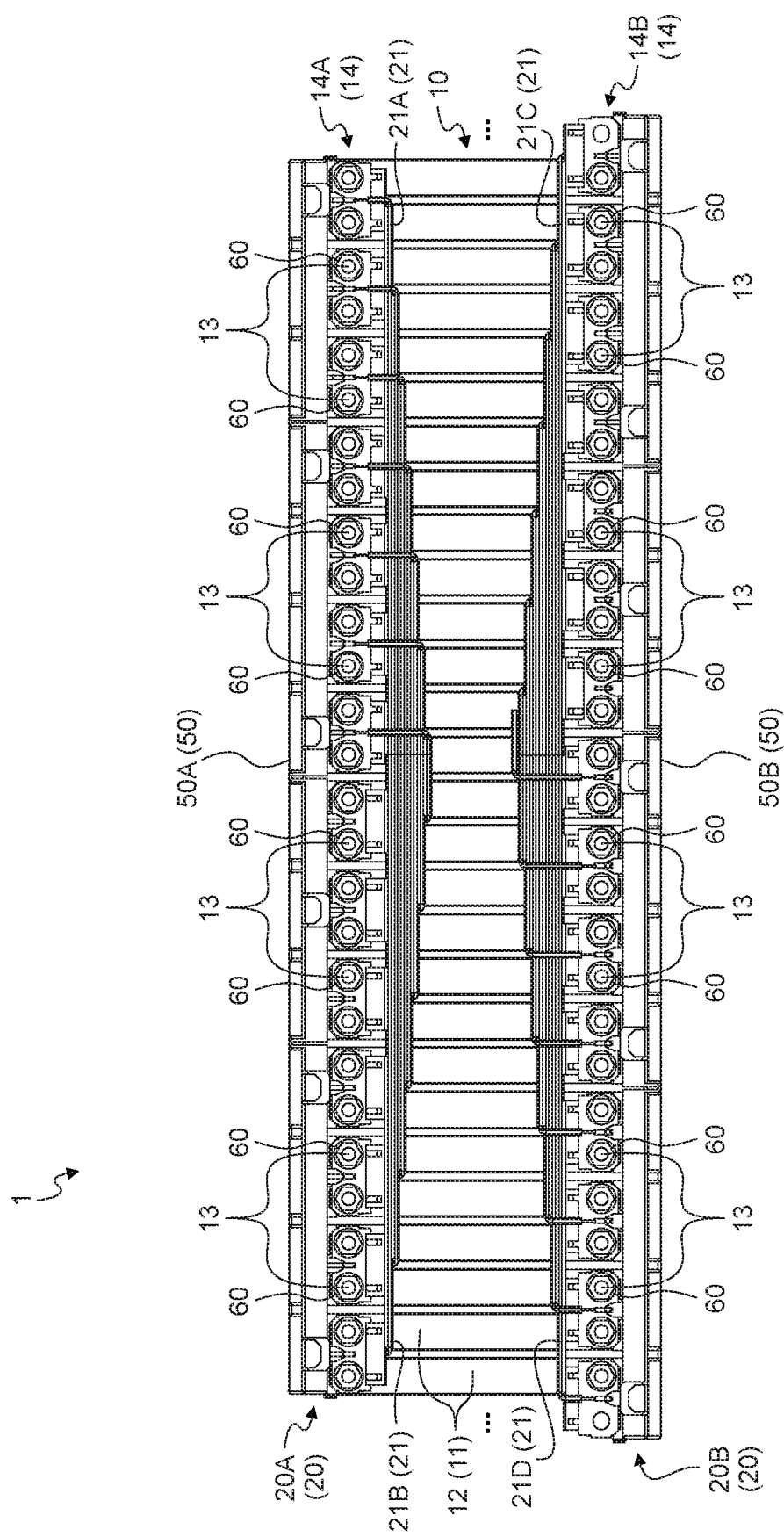
FIG. 4 is a top view illustrating the battery pack of the embodiment.

In the battery module 10, in a state in which the electrode terminals 13 of the respective battery cells 11 on one side are arranged in a row and the electrode terminals 13 on the other side are arranged in a row, the battery cells 11 are arranged in a line. That is, in the battery module 10, the battery cells 11 virtually form a rectangular parallelepiped, and one of the faces is provided with first and second electrode terminal groups 14A and 14B as an electrode terminal group 14 constituted by the electrode terminals 13 arranged in a row (FIGS. 2 and 4). As the battery module 10, in each of the electrode terminal groups 14, the electrode terminals 13 of the positive electrodes and the negative electrodes may be alternately arranged, and the electrode terminals 13 having the same electrode may be arranged side by side. In this example, the former is exemplified. Incidentally, in the battery module 10 in each of the figures, some of the plurality of battery cells 11 arranged are extracted.

The busbar module 20 includes the plurality of basic busbar modules 21 and a holding member 50 that collectively holds the plurality of basic busbar modules 21. The battery pack 1 of this embodiment includes, as the busbar module 20, a first busbar module 20A assembled to the first electrode terminal group 14A and a second busbar module 20B assembled to the second electrode terminal group 14B (FIGS. 1 to 4).

As described above, the basic busbar module 21 includes the plurality of busbars 30 and the flexible flat conductor 40. In the busbar module 20, the number of basic busbar modules 21 is determined based on the number of electrode terminals 13 in the electrode terminal group 14 (in other words, the number of required busbars 30). In this example, the electrode terminal group 14 is divided into a plurality of sections, and the basic busbar module 21 is assembled for each section. The first busbar module 20A prepares first and second basic busbar modules 21A and 21B respectively for two divided sections of the first electrode terminal group 14A, and includes a first holding member 50A that holds the first and second basic busbar modules 21A and 21B. The second busbar module 20B prepares third and fourth basic busbar modules 21C and 21D respectively for two divided sections of the second electrode terminal group 14B, and includes a second holding member 50B that holds the third and fourth basic busbar modules 21C and 21D.

Here, the first to fourth basic busbar modules 21A, 21B, 21C, and 21D may be configured by the busbars 30 and the flexible flat conductors 40 having different shapes or may have the same configuration. In addition, the first holding member 50A and the second holding member 50B may have different shapes or may have the same shape. However, the idea of configuring the basic busbar module 21 is the same in any of the first to fourth basic busbar modules 21A, 21B, 21C, and 21D. In addition, the idea of configuring the holding member 50 is the same regardless of whether the holding member 50 is the first holding member 50A or the second holding member 50B. That is, the idea of configuring the busbar module 20 is the same regardless of whether the busbar module 20 is the first busbar module 20A or the second busbar module 20B. Therefore, in the following description, the busbar module 20 will be described basically taking the first busbar module 20A as an example. In addition, the basic busbar module 21 will be described basically taking the first basic busbar module 21A as an example.

The busbar 30 includes a flat busbar body 31 made of a conductive material such as metal (FIG. 7). The busbar 30 is electrically connected to the electrode terminal 13 via the busbar body 31. For electrical connection between the busbar body 31 and the electrode terminal 13, welding, screwing, or the like is used. In this embodiment, since the electrode terminal 13 also serves as the stud bolt, by tightening nuts 60 illustrated in FIGS. 2 to 4 to the electrode terminals 13, the busbar bodies 31 can be physically and electrically connected to the electrode terminals 13. Therefore, in the busbar body 31, a circular through-hole 31a through which the electrode terminal 13 is inserted is formed. A plurality of the busbars 30 is arranged along the arrangement direction of the electrode terminals 13 of each of the sections in the electrode terminal group 14 to which the busbars 30 are allocated, and is electrically connected to the corresponding electrode terminals 13.

For example, the busbar 30 is formed by subjecting a metal plate (copper plate or the like) as base metal to press working such as punching or bending. In the basic busbar module 21 of this embodiment, after the busbars 30 and the flexible flat conductor 40 are separately formed, the busbars 30 are attached to the flexible flat conductor 40, whereby the busbars 30 and the flexible flat conductor 40 are integrated. Therefore, the busbar 30 is provided with a holding body 32 for attaching the busbar body 31 to the flexible flat conductor 40. In a case where the flexible flat conductor 40 is a flat cable 40A, which will be described later, the busbar 30 may be integrated with the flat cable 40A by performing molding through pressing of a metal plate integrated with the flat cable 40A.

Specifically, the busbar 30 of this embodiment includes the busbar body 31 having a rectangular shape, and the holding body 32 provided at one end of the busbar body 31.

The busbar 30 of this embodiment electrically connects two adjacent electrode terminals 13 of the section in the electrode terminal group 14 to which the busbar 30 is allocated. Therefore, the two through-holes 31a arranged side by side are formed in the busbar body 31. The design value of the pitch between the two through-holes 31a is coincident with the design value of the pitch between the two adjacent electrode terminals 13. The size and shape of the two through-holes 31a with respect to the electrode terminals 13 are set so that the busbars 30 can be assembled to the battery cells 11 even though the interval between the electrode terminals 13 in the two adjacent battery cells 11 deviates to the maximum within the tolerance range.

In the busbar body 31, the holding body 32 is provided at one end portion of both end portions located in a direction perpendicular to the arrangement direction of the two through-holes 31a (that is, the arrangement direction of the electrode terminals 13 in the electrode terminal group 14). Two holding bodies 32 are provided at the end portion. The holding body 32 has a first crimping portion 32a and a second crimping portion 32b (FIG. 6), and the flexible flat conductor 40 is nipped between and held by the first crimping portion 32a and the second crimping portion 32b. The first crimping portion 32a extends from one end portion of the busbar body 31 in the direction perpendicular to the arrangement direction of the through-holes 31a. The second crimping portion 32b extends from the end portion of the extension side of the first crimping portion 32a in a direction perpendicular to the first crimping portion 32a, is inserted into a holding hole 43 of the flexible flat conductor 40 (the flat cable 40A), which will be described later, and is bent from the root (a portion connected to the first crimping portion 32a), whereby fixing to the flexible flat conductor 40 together with the first crimping portion 32a is achieved. The bending direction may be any direction. In this example, the second crimping portion 32b is bent so as to be folded back to the first crimping portion 32a side, and the flexible flat conductor 40 is crimped by the first crimping portion 32a and the second crimping portion 32b to be nipped therebetween.

The flexible flat conductor 40 is a flat conductor having flexibility and includes a conductor portion which is electrically connected to the plurality of busbars 30 and an insulating holding portion which holds the plurality of busbars 30. Here, the flexible flat conductor 40 is exemplified by the flat cable 40A. The flat cable 40A is mainly classified into a conductor portion 40a and a holding portion 40b (FIG. 7), and includes the same number of linear conductors 41 as the number of the busbars 30 to be held, and a covering body 42 for integrating the linear conductors 41 with intervals therebetween. The conductor portion 40a is a portion which electrically connects each of the busbars 30 to a connector (not illustrated), and is constituted by each of the linear conductors 41 and a portion (a covering portion 42a, which will be described later) of the covering body 42 having insulating properties. The connector is provided at one end of the conductor portion 40a and is fitted to a mating connector such that the linear conductors 41 are collectively connected to the respective conductors of the mating connector. The holding portion 40b is a portion that holds each of the busbars 30 and is constituted by the remaining portion (a rib 42b, which will be described later) of the covering body 42.

For example, the linear conductor 41 is used as a voltage detection line for detecting the voltage of the battery cell 11. The linear conductor 41 in this example is a linear columnar body made of a conductive material such as metal (for example, copper) and is flexible to a bendable degree. One linear conductor 41 is prepared for each busbar 30. The linear conductors 41 are arranged on the same plane by being aligned in the axial direction thereof and arranged with intervals therebetween in a direction perpendicular to the axial direction. The linear conductors 41 cause the axial direction to be coincident with the arrangement direction of the busbars 30 (that is, the arrangement direction of the electrode terminals 13 in the electrode terminal group 14) and are arranged side by side with intervals therebetween on the holding body 32 side of the busbar 30. Furthermore, the linear conductors 41 are arranged so that a virtual plane constituted by the linear conductors 41 is substantially parallel to a plane of the busbar bodies 31. In a case where there are limitations on the number of linear conductors 41 that can be arranged on the same plane, all the linear conductors 41 may be arranged by preparing a plurality of combinations of a plurality of linear conductors 41 arranged on the same plane and overlapping these in layers.

The covering body 42 is formed using a material such as a synthetic resin having insulating properties and flexibility so as to have a flat plate-like outer appearance. The covering body 42 has a covering portion 42a which covers the respective linear conductors 41 in the above-described arrangement, and the rib 42b which protrudes from the covering portion 42a in the direction perpendicular to the axial direction of the linear conductor 41 toward the busbar 30 side. The covering portion 42a has columnar portions which separately cover the respective linear conductors 41, and flat plate-like and rectangular portions which connect the adjacent columnar portions. The rib 42b is formed in a flat plate-like and rectangular shape. In the rib 42b, through-holes (hereinafter, referred to as "holding holes") 43 for respectively holding the busbars 30 are formed for the respective busbars 30. The holding holes 43 are arranged along the longitudinal direction of the flat cable 40A (that is, the arrangement direction of the electrode terminals 13 in the electrode terminal group 14). Two holding holes 43 are provided for each of the busbars 30 and are formed according to the arrangement of the second crimping portions 32b so as to cause the second crimping portion 32b of the busbar 30 to be inserted therethrough.

The basic busbar module 21 electrically connects the corresponding linear conductor 41 to the busbar 30 attached to the holding hole 43. The electrical connection may be connection between the busbar 30 and the linear conductor 41 by a conductive member (not illustrated) prepared separately, or may be direct connection between the busbar 30 and the linear conductor 41. In this example, a distal end portion $40a_1$ of the conductor portion 40a in the flat cable 40A is bent toward the busbar 30 which is matched at each of the linear conductors 41, the covering portion 42a at the distal end of the distal end portion $40a_1$ is peeled off, and the exposed linear conductor 41 is electrically connected to the busbar 30, which is matched, by welding, brazing, or the like.

Here, it is desirable that the flat cable 40A be configured to extend and contract in the longitudinal direction (the axial direction of the linear conductor 41) so as to change the interval between the adjacent busbars 30. Therefore, for example, the conductor portion 40a of the flat cable 40A is provided with a U-shaped or mountain-shaped bent portion which enables such extension and contraction between the adjacent busbars 30, although not illustrated.

The holding member 50 is formed to hold the flexible basic busbar module 21 in a state in which deformation such as sagging is suppressed and allow work of assembly to the battery module 10 in this state. Therefore, the holding member 50 is formed of an insulating material such as a synthetic resin. The holding member 50 is mainly divided into holding bodies 51 which hold the plurality of basic busbar modules 21, and insulating cover bodies 52 which cover the conductive members such as the busbars 30 on the battery module 10 after being assembled to the battery module 10 together with the plurality of basic busbar modules 21 (FIGS. 5 and 6 and FIGS. 8 to 10). The holding body 51 and the insulating cover body 52 are connected by a hinge portion 53 provided therebetween (FIGS. 6 and 8 to 10).

Figure 8:
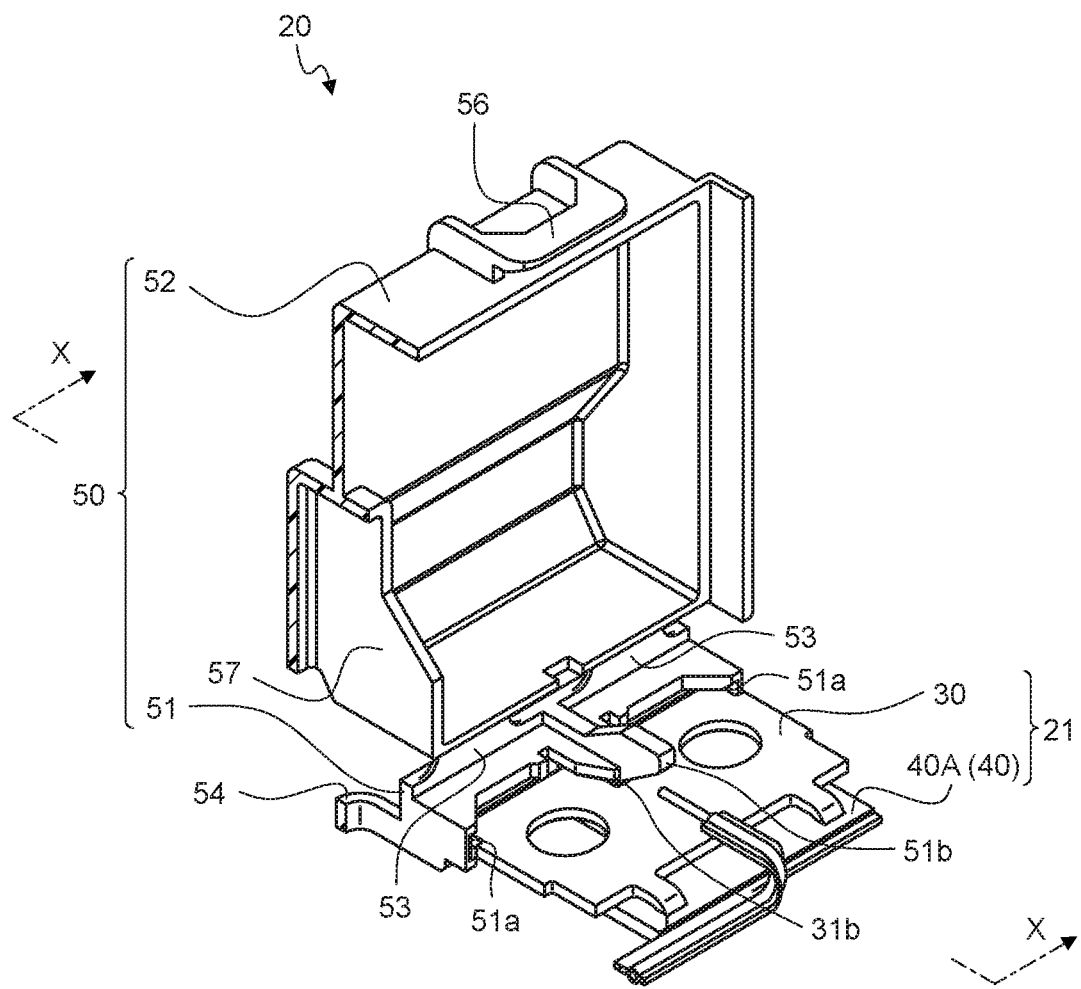
FIG. 8 is a partially enlarged perspective view of the busbar module of the embodiment.
Figure 9:
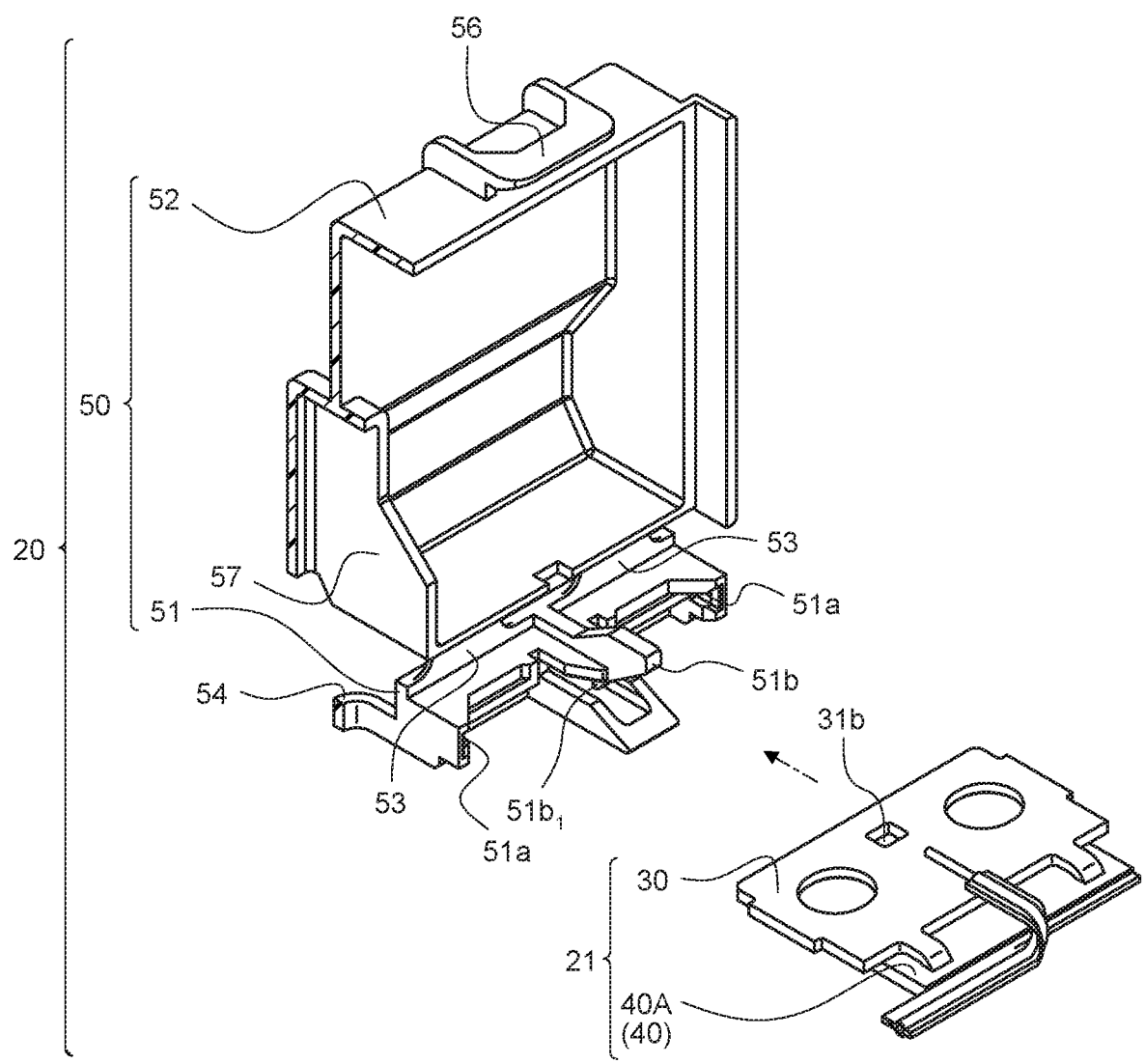
FIG. 9 is a partially enlarged exploded perspective view of the busbar module of the embodiment.
Figure 11:
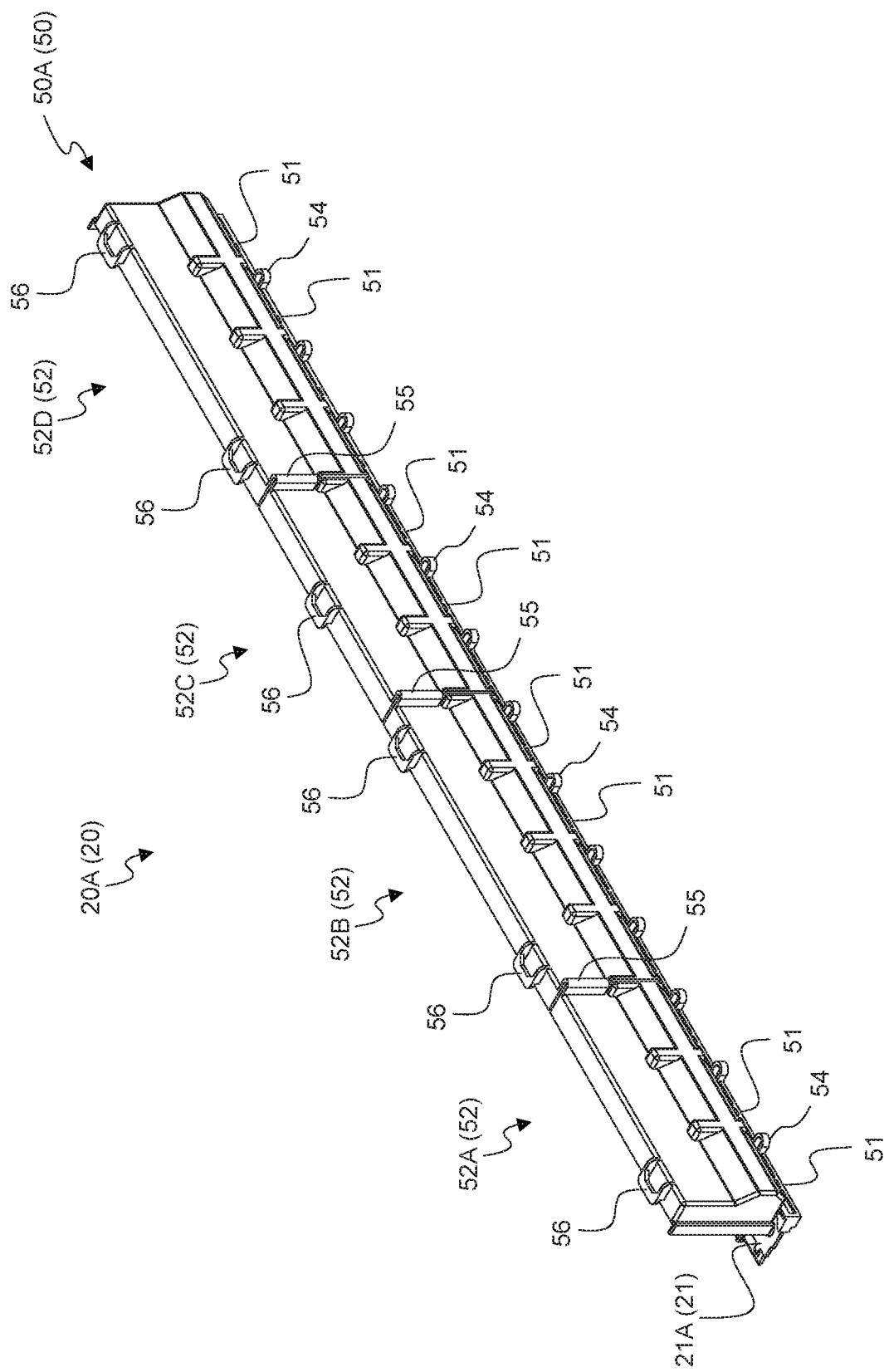
FIG. 11 is a perspective view of the busbar module illustrated in FIG. 5 as seen from the rear side.

The holding body 51 is provided for each of the plurality of busbars 30 in the plurality of basic busbar modules 21. The holding bodies 51 are arranged side by side in the arrangement direction of the busbars 30 (the arrangement direction of the electrode terminals 13 in the electrode terminal group 14) and are connected by connection portions 54 provided therebetween (FIGS. 8, 9, and 11). The connection portion 54 is formed in a U shape having flexibility so as to adjust the interval between the adjacent holding bodies 51, and the free ends thereof are respectively connected to the adjacent holding bodies 51.

Figure 10:
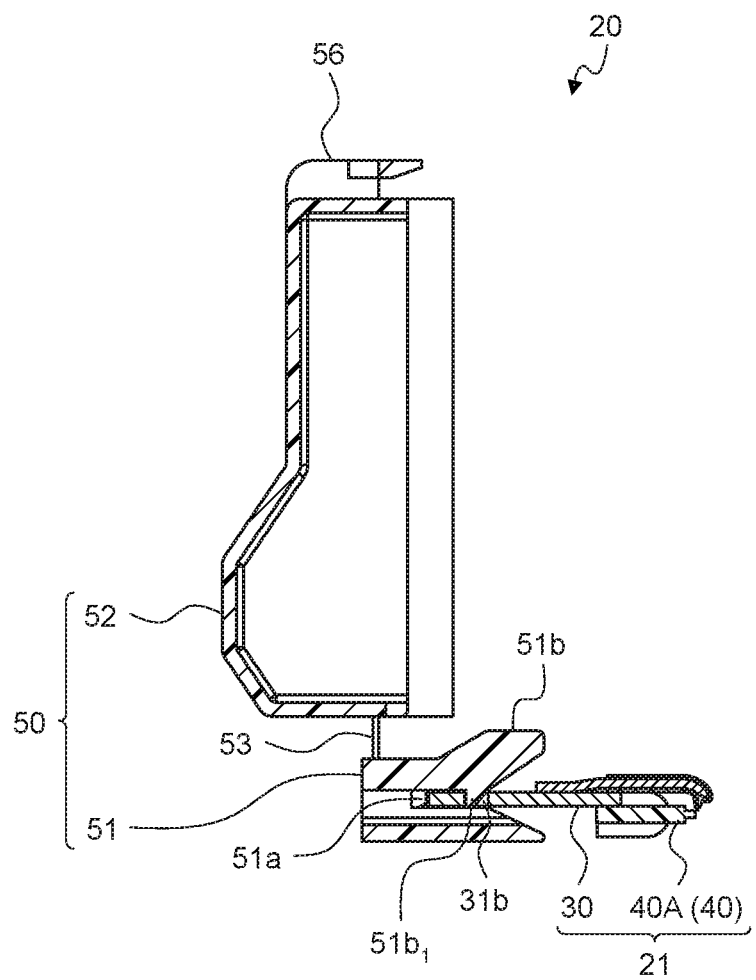
FIG. 10 is a sectional view of the busbar module taken along the line X-X in FIG. 8.

The holding body 51 has an insertion portion 51a into which the busbar 30 is inserted, and a holding portion 51b which is engaged with the busbar 30 during the insertion into the insertion portion 51a and thus holds the busbar 30 (FIGS. 8 to 10). The insertion portion 51a in this example is provided at each of both ends in the arrangement direction of the holding bodies 51 (that is, the arrangement direction of the electrode terminals 13 in the electrode terminal group 14). Two corner portions in the arrangement direction of the busbar 30 at the other end portion of the busbar body 31 (the end portion on the opposite side of the holding body 32) are respectively inserted into the insertion portions 51a. The holding portion 51b has a claw portion $51b_1$ (FIGS. 9 and 10), and the busbar 30 is held by inserting the claw portion $51b_1$ into a locking hole 31b of the busbar body 31. The locking hole 31b in this example is a through-hole which penetrates through the busbar body 31 in the thickness direction. The holding portion 51b has flexibility starting from the root as the origin. Therefore, in the holding portion 51b, the claw portion $51b_1$ is pressed by the busbar body 31 as the insertion of the busbar body 31 into the insertion portion 51a is started, and the claw portion $51b_1$ moves on the plane of the busbar body 31 and is inserted into the locking hole 31b as the insertion of the busbar body 31 into the insertion portion 51a ends. Due to the flexibility of the holding portion 51b, the claw portion $51b_1$ can be detached from the locking hole 31b, so that the busbar 30 can be pulled out from the holding body 51.

After the basic busbar module 21 is assembled to the battery module 10, the insulating cover body 52 covers the conductive members in the basic busbar module 21 and the battery module 10 and thus improves the insulating properties of the battery pack 1. The insulating cover body 52 only has to cover the conductive members to such a degree that conductive bodies such as tools and workers do not come into contact with at least the conductive members. The conductive members include the electrode terminals 13 of the battery module 10 and the busbars 30 in the basic busbar module 21. The insulating cover body 52 is formed in such a shape capable of also covering the electrode terminals 13 by covering the busbars 30 on the battery module 10.

Figure 5:
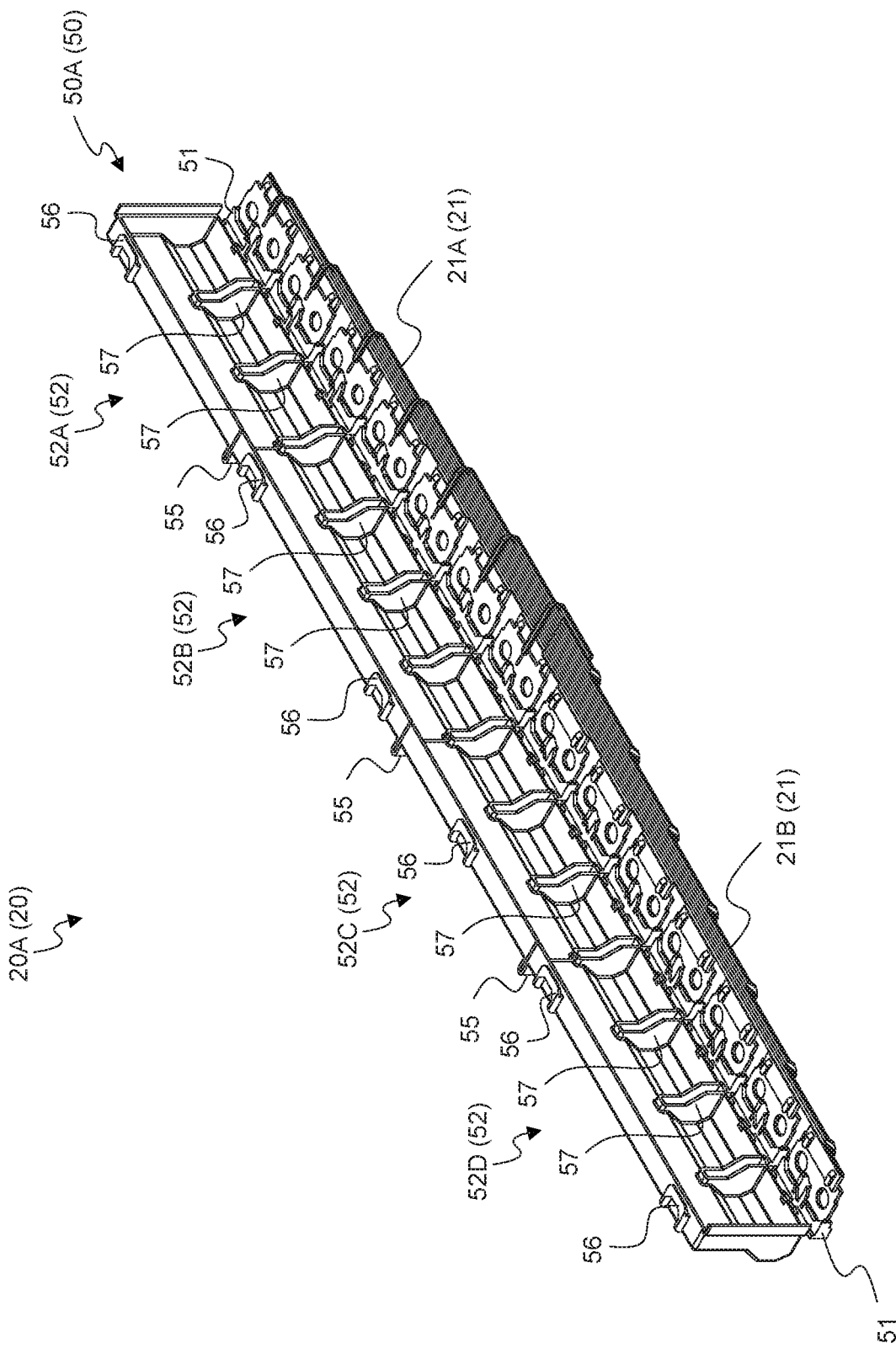
FIG. 5 is a perspective view illustrating a busbar module of the embodiment.
Figure 6:
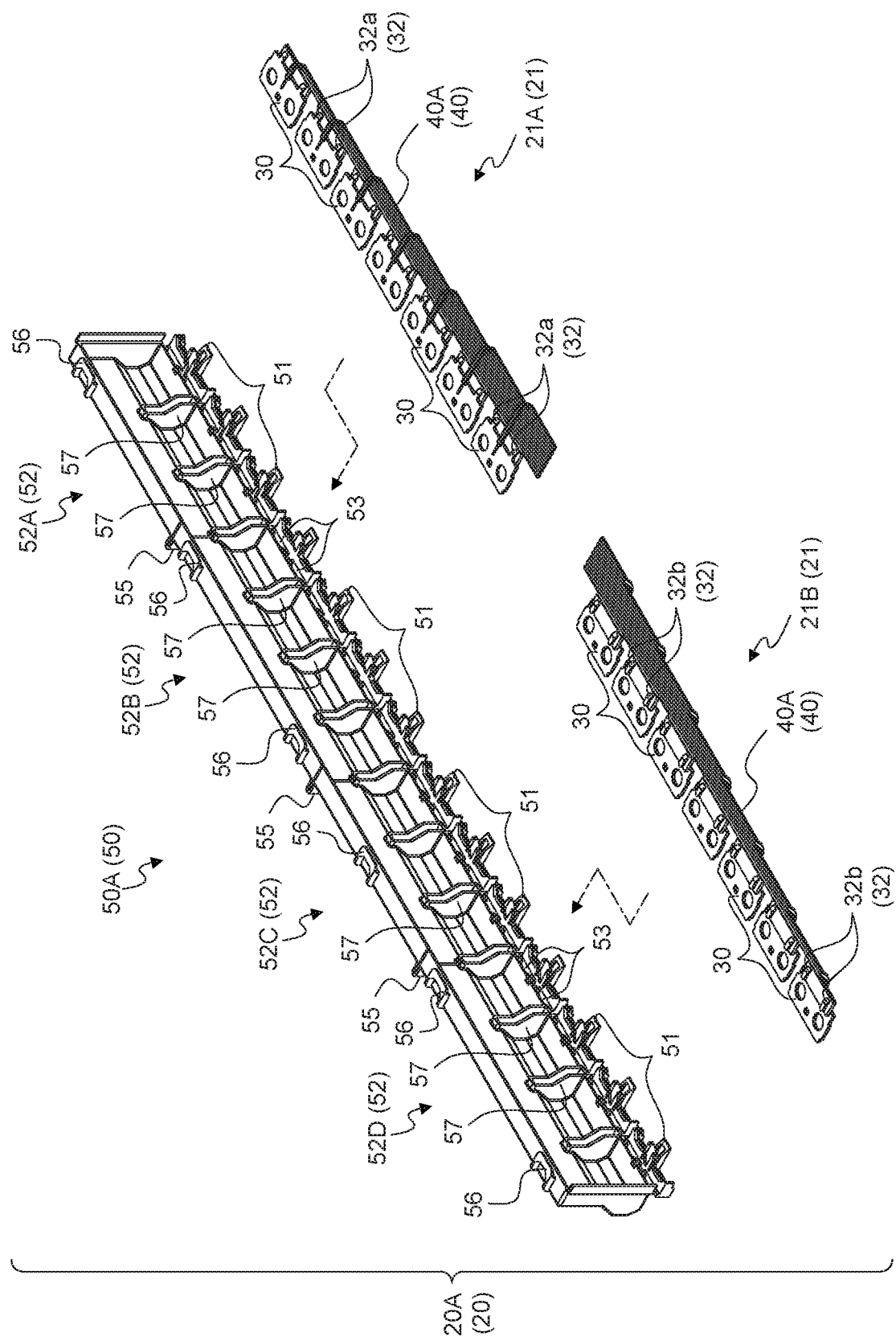
FIG. 6 is an exploded perspective view of the busbar module of the embodiment.
Figure 7:
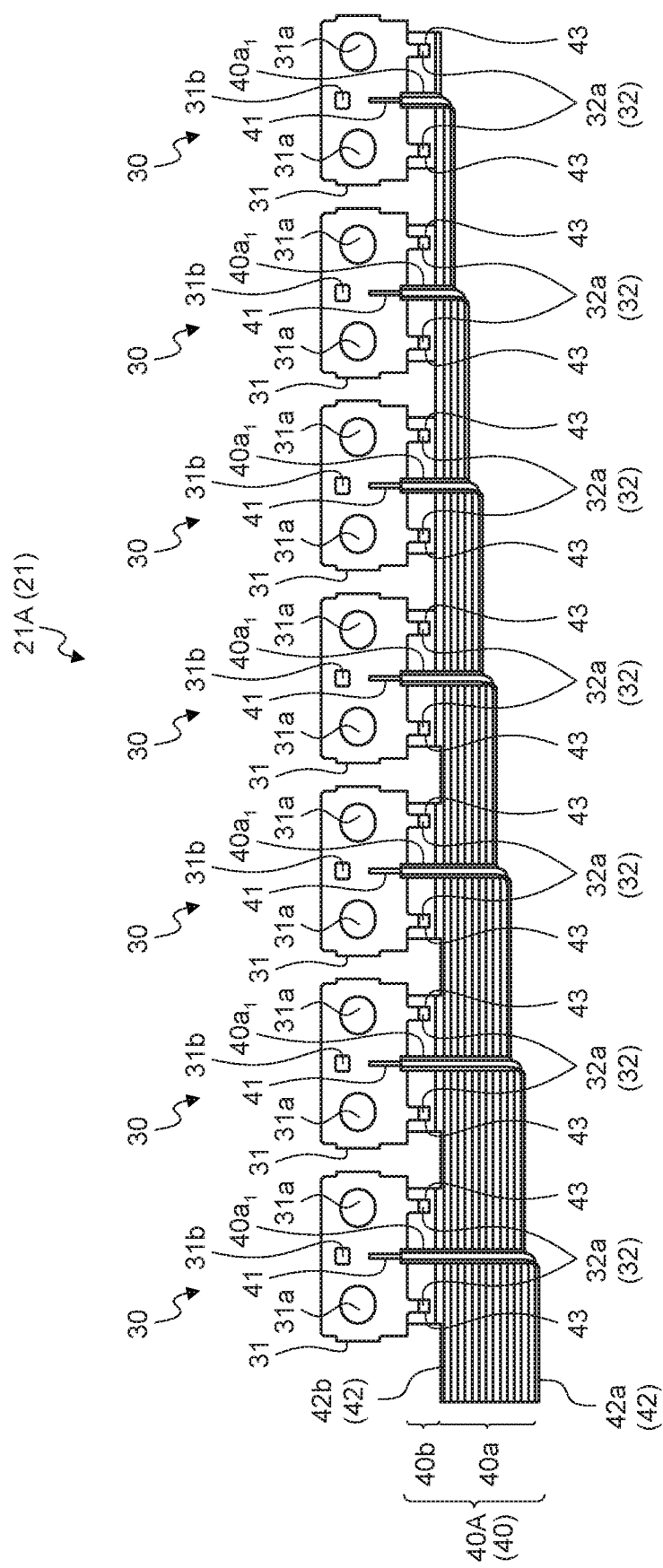
FIG. 7 is a top view illustrating a basic busbar module of the embodiment.

The insulating cover body 52 is divided into a plurality of sections in the arrangement direction of the busbars 30, and the adjacent sections are connected by a connection portion 55 (FIGS. 5, 6, and 11). In this example, first to fourth insulating cover bodies 52A, 52B, 52C, and 52D are provided. The first to fourth insulating cover bodies 52A, 52B, 52C, and 52D are formed so as to cover the plurality of busbars 30. The connection portion 55 is formed in a flexible U shape so as to adjust the interval between the adjacent insulating cover bodies 52 (the first to fourth insulating cover bodies 52A, 52B, 52C, and 52D), and the free ends thereof are respectively connected to the adjacent insulating cover bodies 52.

The hinge portion 53 is formed to change the position of the insulating cover body 52 (the first to fourth insulating cover bodies 52A, 52B, 52C, and 52D) with respect to the holding body 51 between a position where work of connection between the busbar 30 and the electrode terminal 13 is not impeded (connection work position) and a position where the busbar 30 on the battery module 10 is covered (connection work completion position). The hinge portion 53 is provided for each of the holding bodies 51. The holding member 50 is provided with a lock mechanism 56 so that the positional relationship between the holding body 51 and the insulating cover body 52 can be held at the connection work completion position (FIGS. 5, 6, and 8 to 11). At least one lock mechanism 56 is provided in each of the first to fourth insulating cover bodies 52A, 52B, 52C, and 52D. Although not illustrated, the lock mechanism 56 may be constituted by, for example, a claw portion and an engagement portion on which the claw portion is caught. The claw portion and the engagement portion are respectively provided in the insulating cover body 52 and the housing of the battery module 10, for example.

Furthermore, the insulating cover body 52 is provided with an insulating portion 57 for preventing contact between the adjacent busbars 30 (FIGS. 5 and 6). The insulating portion 57 is inserted between the adjacent busbars 30 when the insulating cover body 52 is changed from the connection work position to the connection work completion position and thus prevents conduction between the busbars 30.

Here, in the electrode terminal group 14, there is a possibility that the pitch between the electrode terminals 13 at both ends significantly deviates from the design value of the pitch between the through-holes 31a at both ends in the busbar module 20 due to the accumulation of the deviations of the pitch between the adjacent electrode terminals 13. However, in the busbar module 20 of this embodiment, the interval between the adjacent busbars 30 can be changed by the bent portion of the conductor portion 40a of the flat cable 40A and the connection portions 54 and 55 described above. Therefore, the busbar module 20 of this embodiment can absorb the deviation of the pitch between the electrode terminals 13, so that all the busbars 30 can be inserted through the electrode terminals 13.

As described above, since the busbar module 20 of this embodiment is held by the holding member 50 in a state in which the basic busbar module 21 having flexibility suppresses deformation such as sagging, work of assembly to the battery module 10 can be performed in this state. Therefore, the busbar module 20 and the battery pack 1 of this embodiment can improve the assembly workability when the busbar module 20 is assembled to the battery module 10. Furthermore, in the busbar module 20 of this embodiment, since all the basic busbar modules 21 required for one row of the electrode terminal groups 14 are collectively held by the holding member 50, all the basic busbar modules 21 can be assembled to the battery module 10 with a smaller number of operations than in the conventional manner. Therefore, the busbar module 20 and the battery pack 1 of this embodiment can improve the assembly workability even from this viewpoint. Moreover, in the busbar module 20, all the basic busbar modules 21 required for one row of the electrode terminal groups 14 can be assembled to the battery module 10 in a single operation. Therefore, the busbar module 20 and the battery pack 1 of this embodiment can further suppress the occurrence of erroneous assembly compared to the conventional manner in which the basic busbar modules 21 are separately assembled. Furthermore, the holding member 50 also has a function of an insulating cover by the insulating cover body 52. Therefore, in the busbar module 20 and the battery pack 1 of this embodiment, there is no need to separately provide an insulating cover, so that the assembly workability can be improved even from this viewpoint.

Meanwhile, in this embodiment, the busbar module 20 is exemplified as having the plurality of basic busbar modules 21 and the holding member 50 that collectively holds the plurality of basic busbar modules 21. However, the busbar module 20 may be configured to have a single basic busbar module 21 and the holding member 50 which holds the basic busbar module 21. In this case, the basic busbar module 21 is provided with all the busbars 30 connected to all the electrode terminals 13 of the electrode terminal group 14. Even with this configuration, the busbar module 20 is assembled to the battery module 10 in a state in which the basic busbar module 21 having flexibility is held by the holding member 50, so that the assembly workability is improved. Therefore, even in the battery pack 1 having the busbar module 20, the assembly workability is improved.

Figure 12:
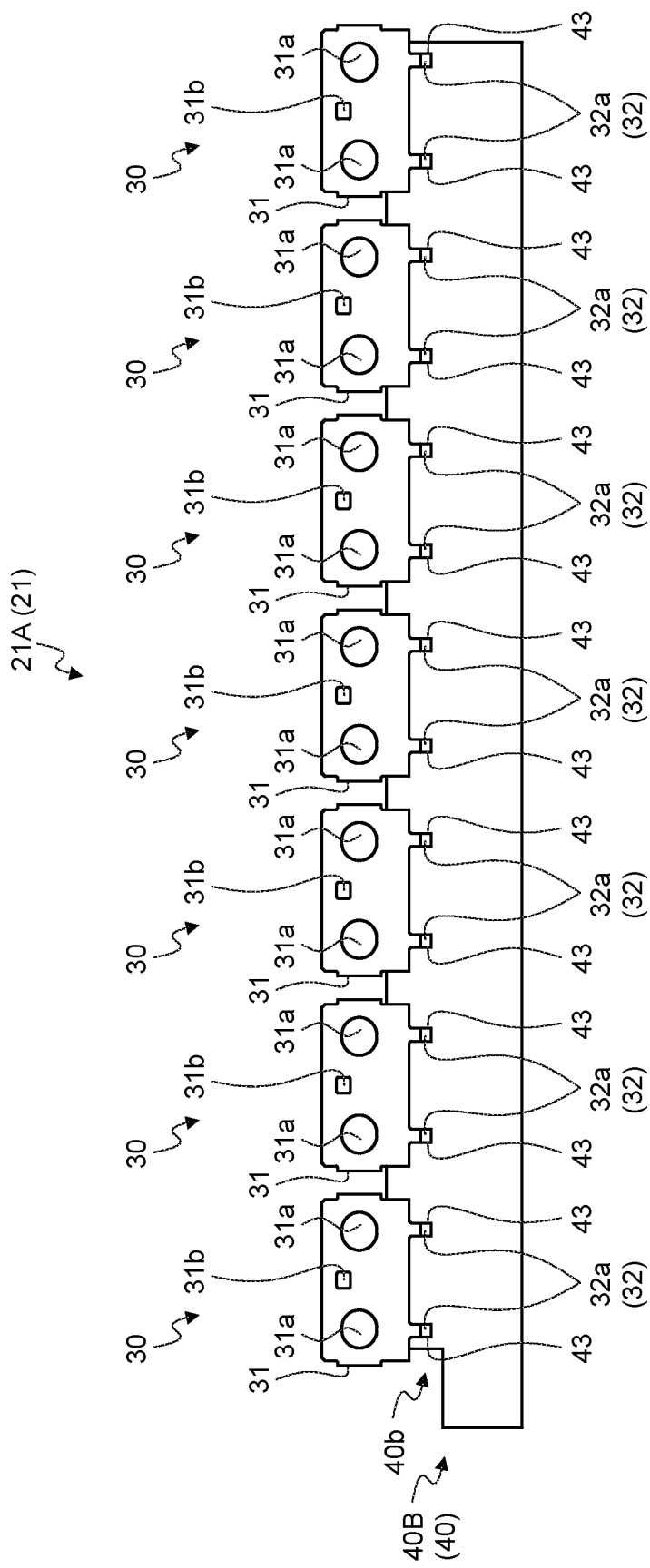
FIG. 12 is a top view illustrating a basic busbar module of another embodiment.

Here, in this example, the flat cable (so-called FC) 40A is taken as an example for the flexible flat conductor 40. Here, the flexible flat conductor 40 is a flat conductor having flexibility and may be of any kind as long as the flexible flat conductor 40 has the conductor portion 40a electrically connected to the plurality of busbars 30 and the insulating holding portion 40b which holds the plurality of busbars 30. Therefore, as the flexible flat conductor 40, not only the flat cable 40A, but also a printed circuit body such as a flexible flat cable (so-called FFC), a flexible printed circuit board (so-called FPC), and a membrane wiring board is conceivable. FIG. 12 illustrates the flexible flat conductor 40 provided as a printed circuit body 40B. The printed circuit body 40B has a conductor portion (not illustrated) on which a conductor (having the same function as that of the linear conductor 41 of the flat cable 40A) is printed and the holding portion 40b in which a holding hole 43 (the same as the holding hole 43 of the flat cable 40A) is formed for each of the busbars 30. Even if the busbar module 20 and the battery pack 1 of this embodiment use the flexible flat conductor 40 described above, the same effects as in the above example can be obtained.

Modification Example

A modification example of the busbar module and the battery pack according to the present invention will be described with reference to FIGS. 13 to 18.

Figure 13:
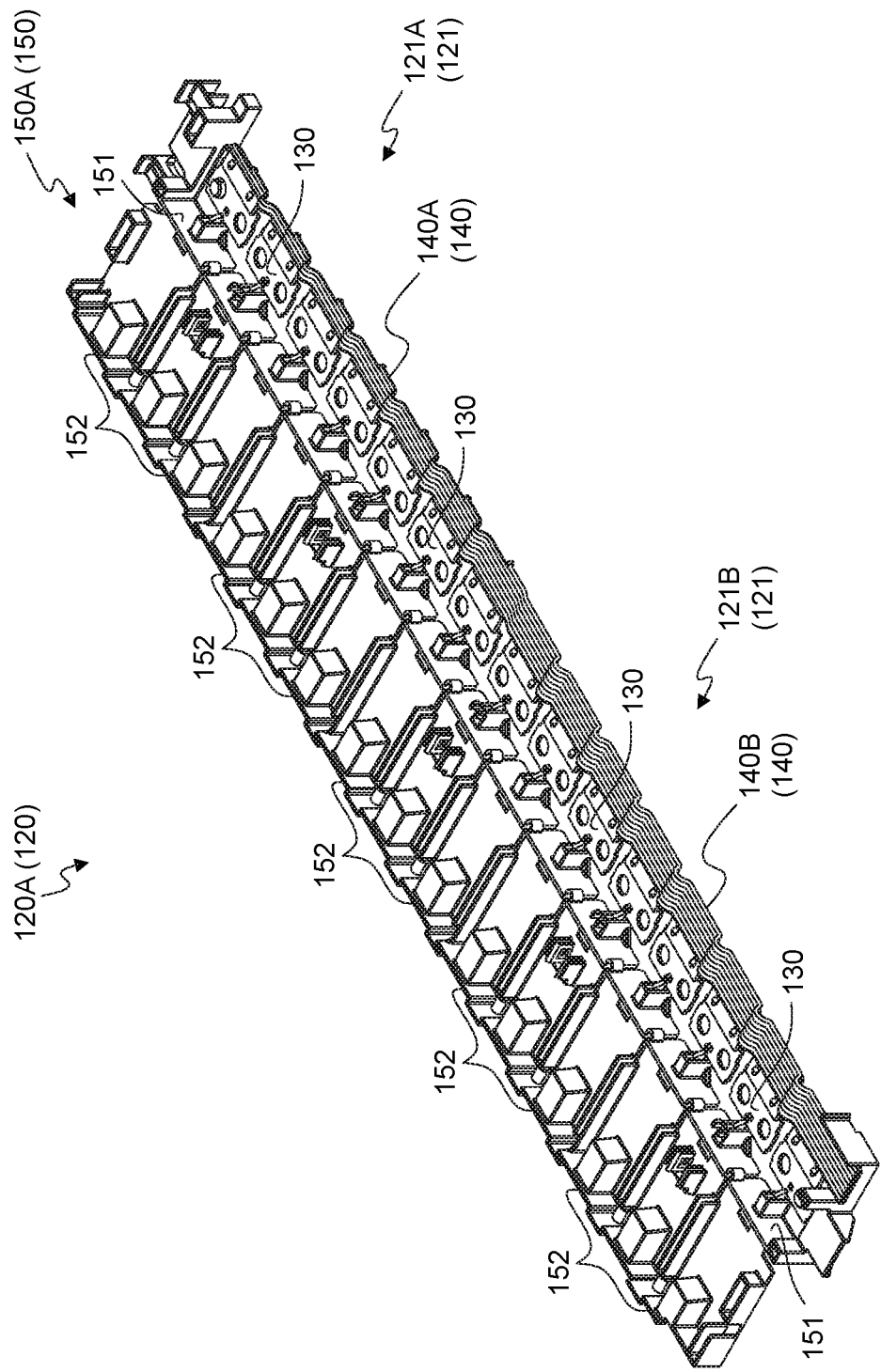
FIG. 13 is a perspective view illustrating a busbar module of a modification example, and is a view illustrating a state in which the insulating cover body is opened.
Figure 14:
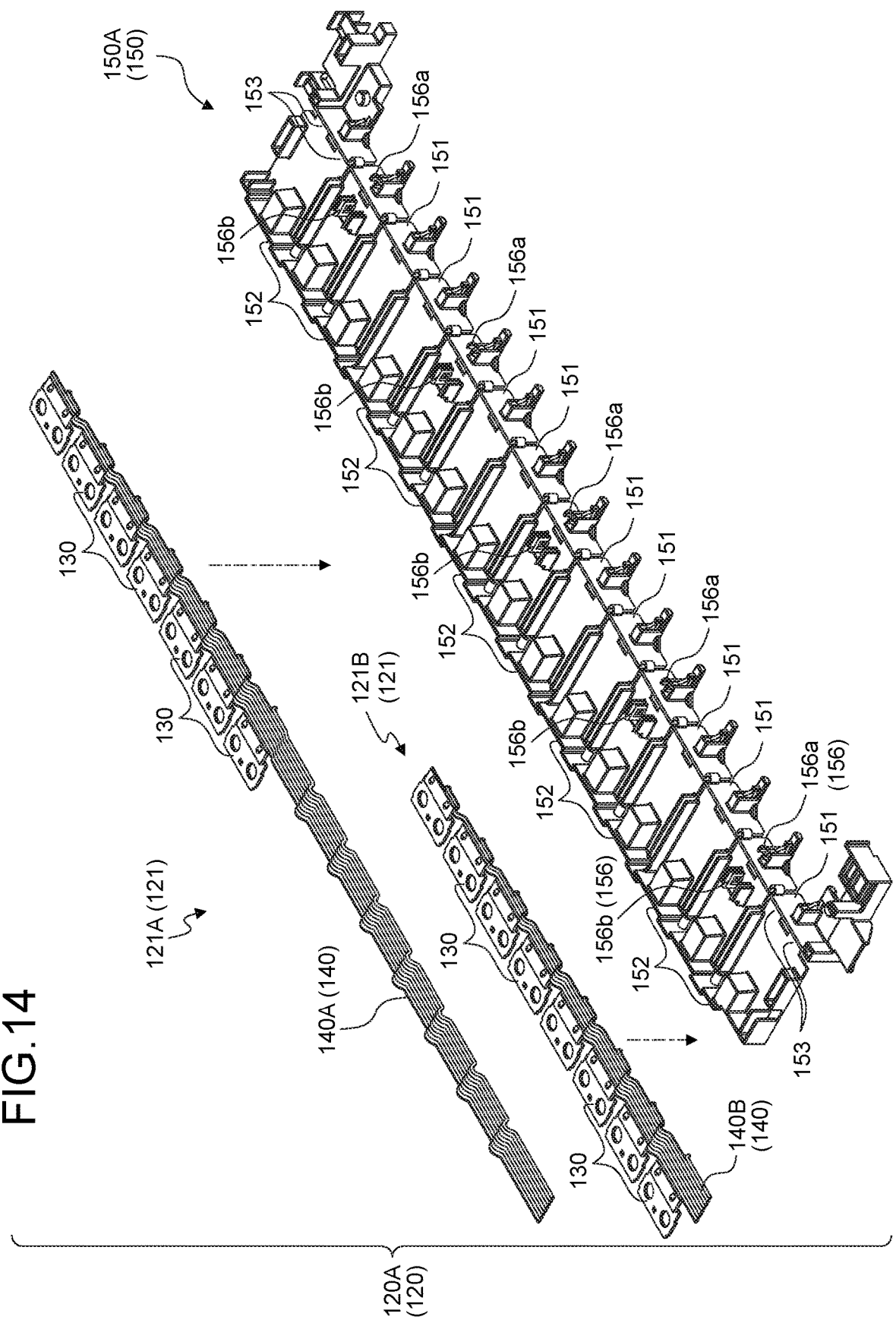
FIG. 14 is an exploded perspective view of the busbar module of the modification example.

Reference numeral 120 in FIGS. 13 and 14 denotes the busbar module of this modification example. Although not illustrated, a busbar module 120 of this modification example is assembled to the battery module 10 like the busbar module 20 of the embodiment, and forms a battery pack together with the battery module 10. The busbar module 120 includes a plurality of basic busbar modules 121 and a holding member 150 that collectively holds the plurality of basic busbar modules 121.

The basic busbar module 121 is equivalent to the basic busbar module 21 of the embodiment, and includes a plurality of busbars 130 and a flexible flat conductor 140. Therefore, the same busbar 30 as that of the embodiment is used as the busbar 130. Therefore, although reference numerals are not assigned to the respective configurations of the busbars 130 for convenience of illustration, in the case of assigning the reference numerals, the same busbars 30 are used. In addition, like the flexible flat conductor 40 of the embodiment, the flexible flat conductor 140 has a conductor portion 40a and a holding portion 40b (FIG. 14). Here, a flat cable is taken as an example of the flexible flat conductor 140.

The holding member 150 is formed of an insulating material such as a synthetic resin like the holding member 50 of the embodiment in order to hold the flexible basic busbar modules 121 in a state in which deformation such as sagging is suppressed and allow work of assembly to the battery module 10 in this state. However, the holding member 150 of this modification example has a different structure from the holding member 50 of the embodiment, and is configured as follows.

Here, only a first busbar module 120A (assembled to the first electrode terminal group 14A) is illustrated as the busbar module 120, but a second busbar module assembled to the second electrode terminal group 14B is configured similarly to the first busbar module 120A. The first busbar module 120A in this example includes two basic busbar modules 121 (first and second basic busbar modules 121A and 121B) for each section of the first electrode terminal group 14A, and a holding member 150 (first holding member 150A) that collectively holds the first and second basic busbar modules 121A and 121B.

The first basic busbar module 121A includes the plurality of busbars 130 arranged in the same manner as in the embodiment and a first flat cable 140A as the flexible flat conductor 140 which is physically and electrically connected to each of the busbars 130. In addition, the second basic busbar module 121B includes the plurality of busbars 130 arranged in the same manner as in the embodiment and a second flat cable 140B as the flexible flat conductor 140 which is physically and electrically connected to each of the busbars 130. The second basic busbar module 121B is disposed closer to the connector side (not illustrated) than the first basic busbar module 121A. To the connector, each of the busbars 130 is electrically connected via the first busbar module 120A, and the connector is disposed on one end side in the arrangement direction of the busbars 130.

The first flat cable 140A and the second flat cable 140B have the same configuration as that of the flat cable 40A of the embodiment. Therefore, although reference numerals are not assigned to the respective configurations of the first flat cable 140A and the second flat cable 140B for convenience of illustration, in the case of assigning the reference numerals, the same flat cables 40A are used. However, regarding the first flat cable 140A of this modification example, when each of the linear conductors 41 and the covering body 42 are caused to extend to the connector (FIG. 14) and are attached to the first holding member 150A, the linear conductors 41 and the covering body 42 are layered with respect to the corresponding linear conductors 41 and the covering body 42 of the second flat cable 140B (FIG. 13).

The first holding member 150A (holding member 150) is mainly divided into holding bodies 151 which hold the first and second basic busbar modules 121A and 121B (the plurality of basic busbar modules 121), and insulating cover bodies 152 which cover the conductive members such as the busbars 130 on the battery module 10 after being assembled to the battery module 10 together with the first and second basic busbar modules 121A and 121B (FIG. 14). The holding body 151 and the insulating cover body 152 are formed integrally with each other in a state of being connected by a hinge portion 153 provided therebetween.

Figure 15:
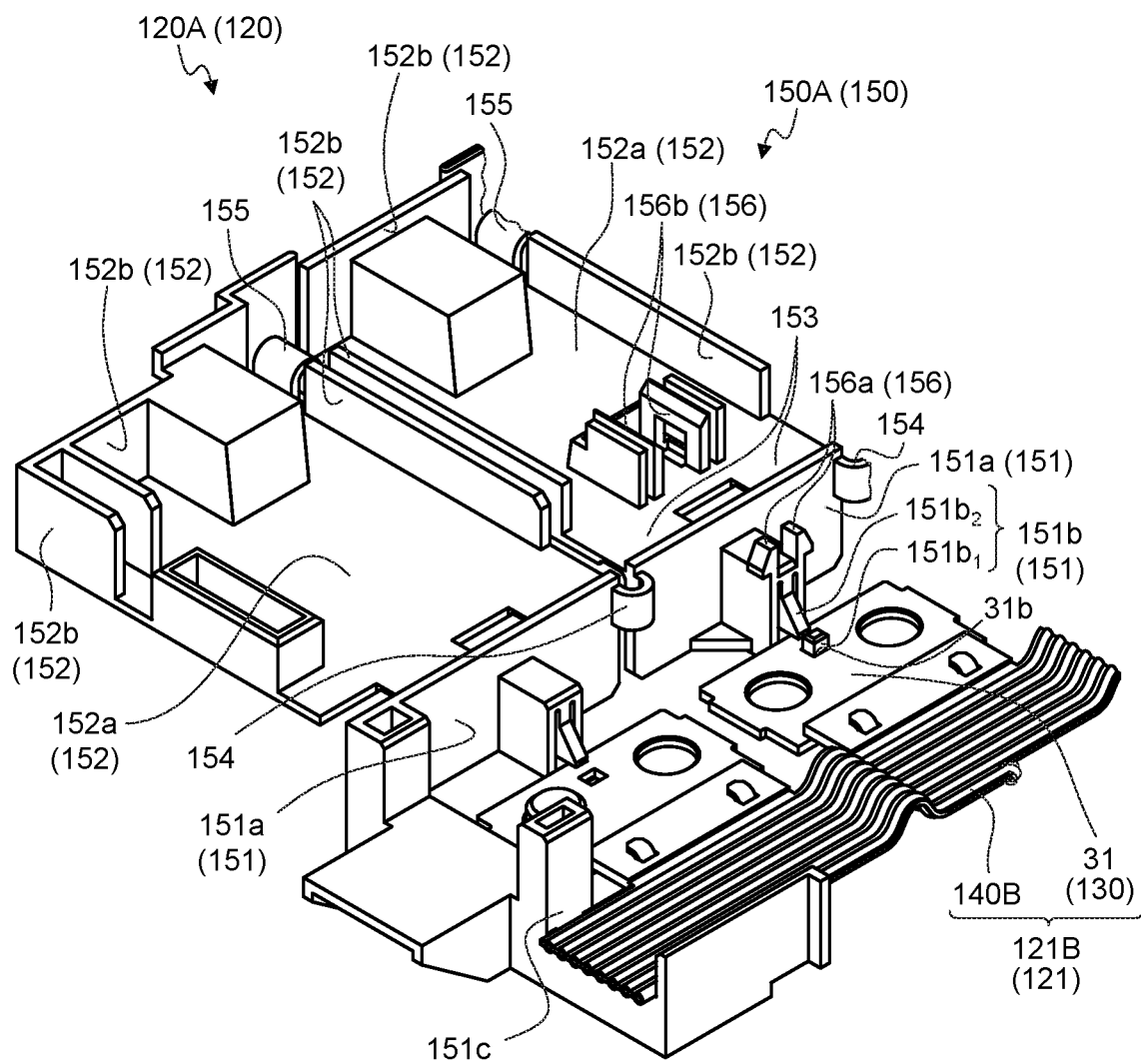
FIG. 15 is a partially enlarged perspective view of the busbar module of the modification example.
Figure 16:
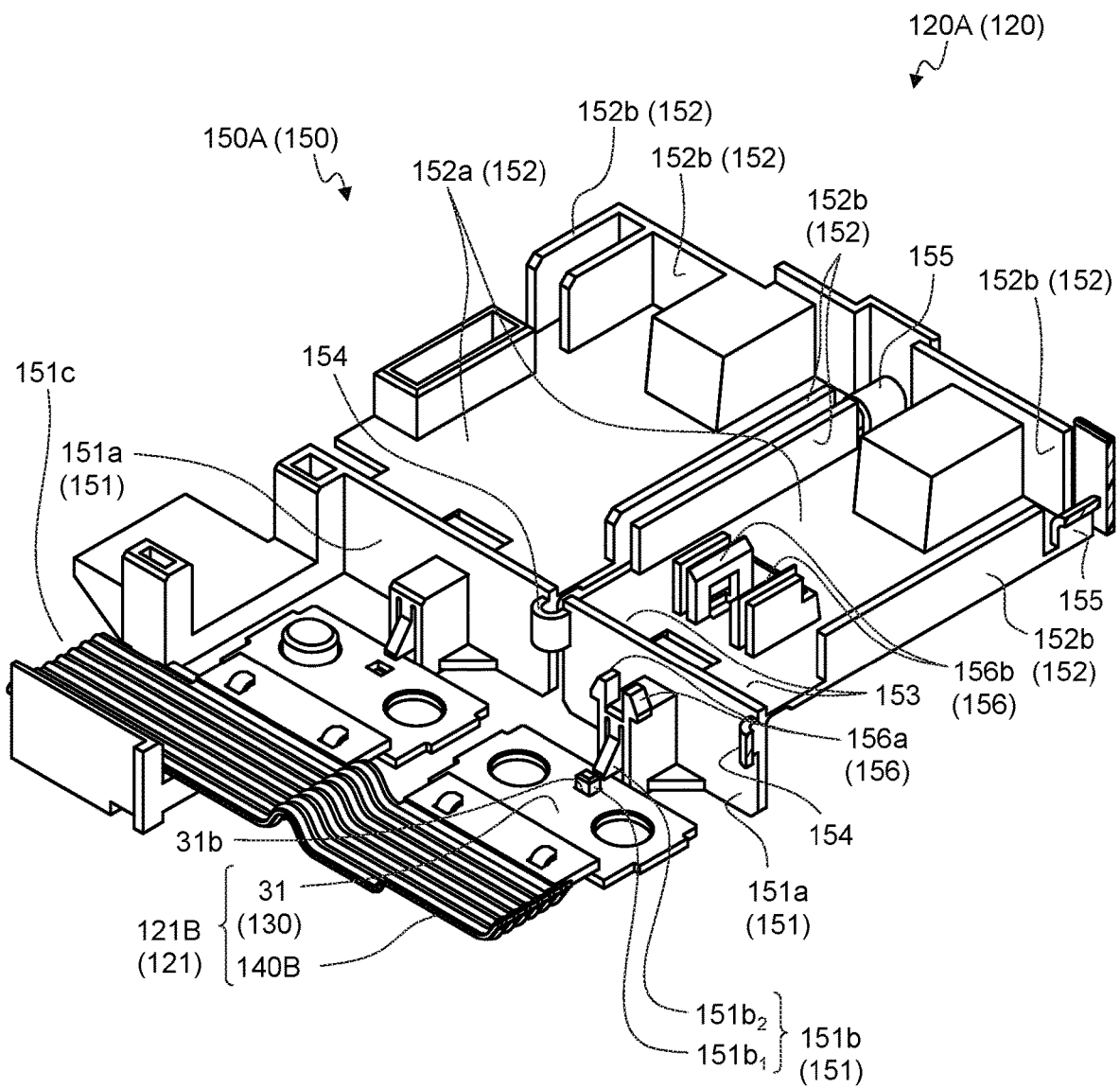
FIG. 16 is a partially enlarged perspective view of the busbar module of the modification example as seen from another angle.
Figure 17:
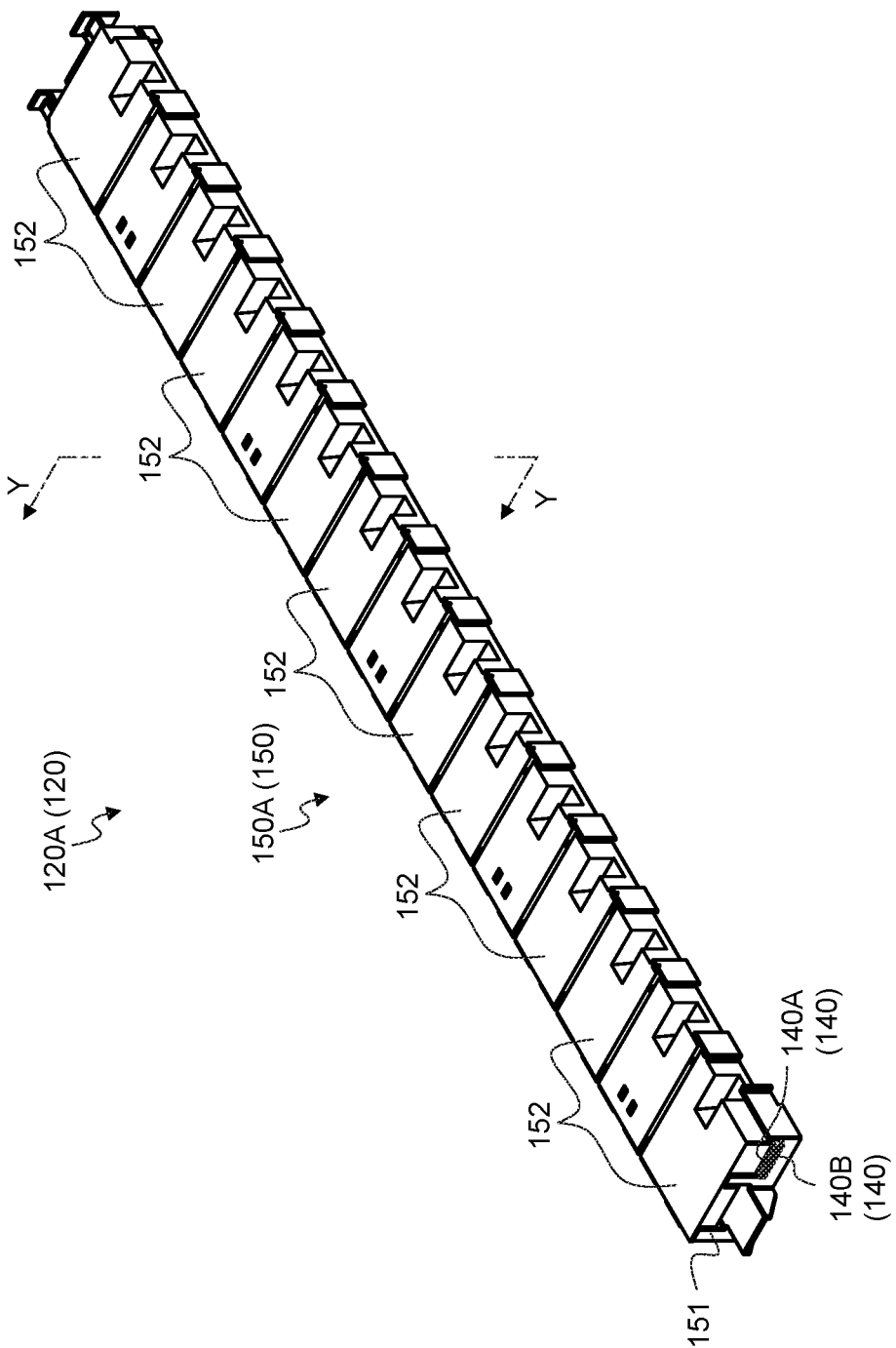
FIG. 17 is a perspective view illustrating the busbar module of the modification example, and is a view illustrating a state in which the insulating cover body is closed.

The holding body 151 is provided for each of the busbars 130. The holding body 151 includes a base portion 151a and a holding mechanism 151b (FIGS. 15 and 16). The holding bodies 151 are integrated by connecting the base portions 151a of the adjacent holding bodies 151 with connection portions 154 provided therebetween. In the figure, illustration of the first basic busbar module 121A is omitted.

The base portion 151a is formed in a rectangular plate shape and is disposed such that the plane thereof intersects the plane of the busbar body 31 of the assembled busbar 130. In this example, the planes of the base portion 151a and the busbar body 31 are perpendicular to each other.

The holding mechanism 151b is disposed in a state of protruding from one plane of the base portion 151a. The holding mechanism 151b includes an insertion portion $151b_1$ to be inserted into the locking hole 31b of the busbar body 31, and a holding portion $151b_2$ which is engaged with the busbar body 31 during the insertion and thus holds the busbar 130 (FIGS. 15 and 16). The insertion portion $151b_1$ protrudes along the plane of the base portion 151a, and is formed in a rectangular parallelepiped so as to match the rectangular locking hole 31b. In the holding mechanism 151b, the direction opposite to the protruding direction of the insertion portion $151b_1$ is the attachment direction of the busbar 130. The holding portion $151b_2$ is formed as a claw having flexibility and is pressed and bent by the busbar body 31 as the insertion of the insertion portion $151b_1$ into the locking hole 31b is started. In addition, the holding portion $151b_2$ returns to its original shape as the insertion of the insertion portion $151b_1$ into the locking hole 31b is completed, and faces the plane of the busbar body 31 in the insertion direction. Therefore, even when the busbar body 31 tries to escape from the insertion portion $151b_1$, the busbar body 31 can be locked. Therefore, the holding mechanism 151b can hold the attached busbar 130, and the insertion completion position can be regarded as a holding position of the busbar 130. In the holding body 151, the busbar 130 is held on an edge portion side among the four edge portions of the base portion 151a, which is the battery module 10 side after being attached. Furthermore, the holding mechanism 151b is not necessarily limited to this structure, and may be replaced with one having a different structure or used in combination with one having a different structure.

The holding body 151 is provided with a positioning portion 151c for placing and positioning the flexible flat conductor 140 (the first flat cable 140A) in the base portion 151a on the connector side (FIGS. 15 and 16). The positioning portion 151c in this example is formed in a groove shape in which the second flat cable 140B is placed at the time of assembly of the second basic busbar module 121B to the holding body 151 and the first flat cable 140A is thereafter placed at the time of assembly of the first basic busbar module 121A to the holding body 151.

The insulating cover body 152 has the same function as the insulating cover body 52 of the embodiment. The insulating cover body 152 in this example is provided for each of the busbars 130. The insulating cover body 152 includes a base portion 152a (FIGS. 15 and 16). The base portion 152a is formed in a rectangular plate shape, and one edge portion is connected to the base portion 151a of the holding body 151 via the hinge portion 153. Here, the edge portion is connected to the edge portion side opposite to the holding position of the busbar 130 in the other plane of the base portion 151a. The insulating cover body 152 can perform an operation of rotating relative to the holding body 151 via the hinge portion 153 and can perform an opening and closing operation with respect to the holding body 151 in response to the rotating operation.

When the insulating cover body 152 is positioned in a state of being opened to the holding body 151 (FIGS. 13, 15, and 16), an insertion path of the busbar 130 with respect to the holding body 151 is in an empty state. Therefore, as described in the embodiment, the position in the opened state is a position where the work of connection between the busbar 130 and the electrode terminal 13 is not impeded (connection work position). On the other hand, when the insulating cover body 152 is positioned in a closed state with respect to the holding body 151 (FIG. 17), one plane of the base portion 152a faces the conductive members such as the busbar 130 attached to the holding body 151 such that the conductive member is in a covered state. That is, as described in the embodiment, the position in the closed state is a position that covers the busbar 130 on the battery module 10 (connection work completion position). The insulating cover body 152 includes a wall portion 152b provided upright from one plane of the base portion 152a (FIGS. 15 and 16).

The insulating cover bodies 152 are integrated by connecting the base portions 152a of the adjacent insulating cover bodies 152 with connection portions 155 provided therebetween.

As described above, the first holding member 150A of this modification example is provided with a combination of the holding structure and the covering structure of the busbar 130 for each of the busbars 130.

Here, in the first holding member 150A, the connection portion 154 on the holding body 151 side is formed in a flexible U shape so as to adjust the interval between the combinations of the adjacent base portions 151a and the holding mechanisms 151b, and the free ends thereof are respectively connected to the adjacent base portions 151a. Furthermore, the connection portion 155 of the insulating cover body 152 is formed in a flexible U shape so as to adjust the interval between the adjacent insulating cover bodies 152, and the free ends thereof are respectively connected to the adjacent base portions 152a. Therefore, since the first holding member 150A can adjust the interval between the combinations of the holding structures and the cover structures of the busbars 130 in the arrangement direction of the busbars 130 for each of the busbars 130, design tolerance of components such as the busbars 130 and deviation due to accumulation of assembly tolerance of the components can be absorbed.

Figure 18:
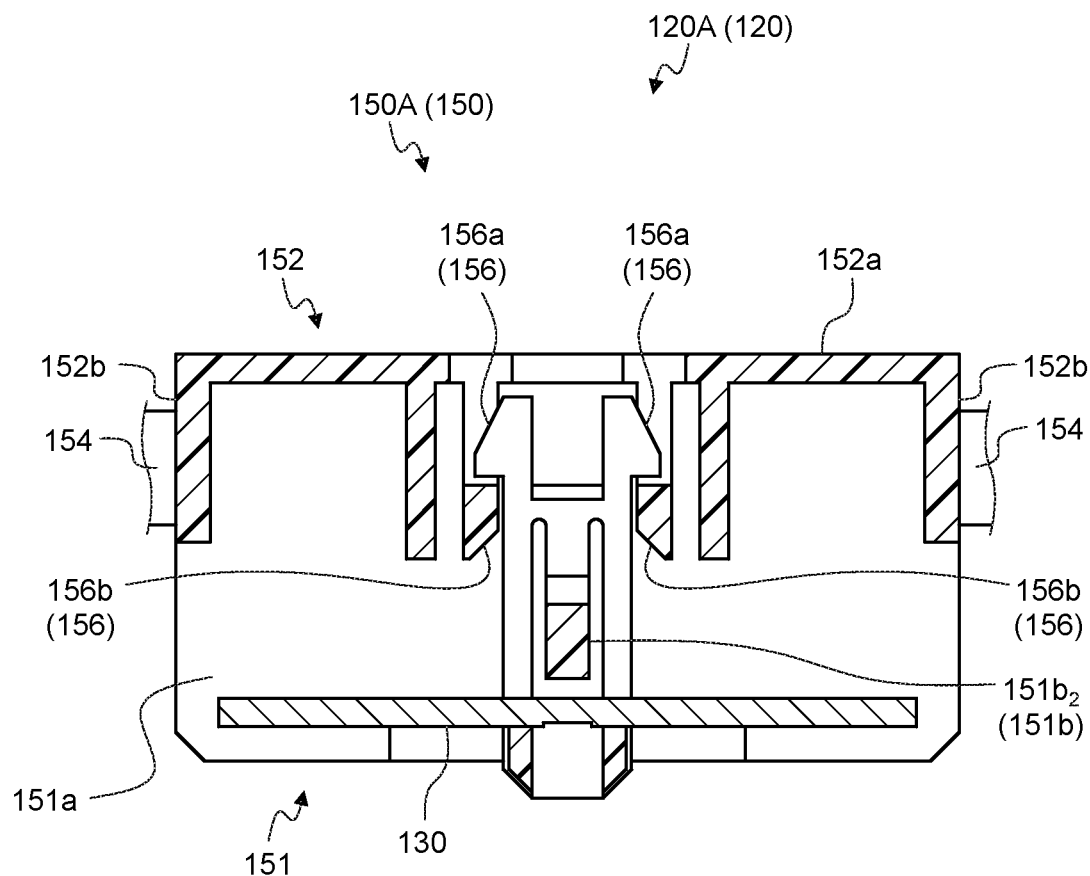
FIG. 18 is a partially enlarged sectional view of the busbar module taken along the line Y-Y in FIG. 17.

Furthermore, the first holding member 150A of this modification example is provided with a lock mechanism 156 which holds the closed state of the insulating cover body 152 with respect to the holding body 151 capable of covering the conductive members such as the busbar 130 on the battery module 10 (FIGS. 15, 16, and 18). The lock mechanism 156 includes a first locking portion 156a provided on the holding body 151 side, and a second locking portion 156b provided on the insulating cover body 152 side and holding the closed state between the holding body 151 and the insulating cover body 152 by being locked to the first locking portion 156a. The lock mechanism 156 is provided for at least two combinations of the holding body 151 and the insulating cover body 152 which can be opened and closed with respect to each other. The number and arrangement positions of the lock mechanisms 156 may be determined according to the number of combinations of the holding body 151 and the insulating cover body 152.

For example, one of the first locking portion 156a and the second locking portion 156b is formed as a claw portion, and the other is formed as a locking piece portion on which the claw portion is caught. In the lock mechanism 156, the claw portion is caught on the wall surface of the locking piece portion when the holding body 151 and the insulating cover body 152 are in the closed state, and the closed state is held. In this example, the first locking portion 156a serves as the claw portion, and the second locking portion 156b serves as the locking piece portion.

The first locking portion 156a is disposed at the same position as the holding mechanism 151b (that is, in a state of protruding from one plane of the base portion 151a of the holding body 151). The base portion 151a is provided with two first locking portions 156a in which the directions of the claws (that is, protruding directions) are opposite to each other along the arrangement direction of the busbars 130. The directions of the claws of the first locking portions 156a do not face each other in the arrangement direction.

In addition, the second locking portion 156b is disposed in a state of being protruding from one plane of the base portion 152a of the insulating cover body 152. The base portion 152a is provided with two C-shaped protruding bodies of which the free end sides act as the root. The protruding bodies are spaced apart from each other so as to cause the C-shaped planes to face each other in the arrangement direction of the busbars 130 and are arranged along the positions of the first locking portions 156a when the holding body 151 and the insulating cover body 152 are in the closed state. In the protruding body, a protruding side piece portion is used as the second locking portion 156b, and when the holding body 151 and the insulating cover body 152 are in the closed state, the first locking portion 156a is inserted into a through-hole portion in the C-shape.

In the lock mechanism 156, after the first and second basic busbar modules 121A and 121B are attached to the holding body 151, as the holding body 151 and the insulating cover body 152 are close to the closed state, the first locking portions 156a respectively abut the second locking portions 156b, and the first locking portions 156a ride on the second locking portions 156b while at least one of the first locking portions 156a and the second locking portions 156b are bent. In the lock mechanism 156, when the holding body 151 and the insulating cover body 152 thereafter enter the closed state, the first locking portion 156a is inserted into the through-hole portion included in the protruding body, and one of the first locking portion 156a and the second locking portion 156b where bending occurs returns to its original shape. Accordingly, in the lock mechanism 156, even when the insulating cover body 152 tries to move in an opening direction with respect to the holding body 151, the first locking portion 156a is locked to the second locking portion 156b, so that the closed state between the holding body 151 and the insulating cover body 152 can be maintained.

Like the busbar module 20 of the embodiment, in the busbar module 120 of this modification example, the basic busbar module 121 having flexibility is held by the holding member 150 in a state in which deformation such as sagging is suppressed. Therefore, the busbar module 120 and the battery pack 1 of this modification example can obtain the same effects as those of the busbar module 20 and the battery pack 1 of the embodiment, such as improving the assembly workability when the busbar module 120 is assembled to the battery module 10. Furthermore, in the busbar module 120 of this modification example, since the lock mechanism 156 can be constructed only with the holding member 150 without influences of the other components such as the battery module 10, versatility can be enhanced. Therefore, in the busbar module 120 and the battery pack 1 of this modification example, due to the versatility, uniformity in workability when the holding body 151 and the insulating cover body 152 are caused to enter the closed state can be achieved, and even from this viewpoint, the assembly workability can be improved.

In the busbar module 120 of this modification example, at the time of assembly work, for example, the holding member 150 is placed on a workbench and the basic busbar module 121 can be attached to the holding body 151 along the vertical direction with respect to the plane of the workbench. Therefore, in the case of employing such a work mode of the assembly work, the busbar module 120 can facilitate the work of attaching the basic busbar module 121 compared to the busbar module 20 of the embodiment in which the basic busbar module 21 is attached to the holding body 51 along the plane of the workbench, thereby improving the assembly workability of itself.

In the busbar module according to the present embodiment, even when deformation such as sagging occurs in the basic busbar module due to its own weight or the like, since the basic busbar module is held by the holding member in a state in which the deformation is suppressed, work of assembly to the battery module in this state can be performed. Therefore, the busbar module and the battery pack according to the present embodiment can improve assembly workability when the busbar module is assembled to the battery module.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. A busbar module comprising:
a basic busbar module assembled to an electrode terminal group arranged in a row of a battery module formed of a plurality of battery cells; and
a holding member that holds the basic busbar module, wherein
the basic busbar module includes:
a plurality of busbars that is arranged along an arrangement direction of respective electrode terminals of the electrode terminal group and is electrically connected to the corresponding electrode terminals; and
a flexible flat conductor having a conductor portion that is electrically connected to the plurality of busbars, and an insulating holding portion that holds the plurality of busbars,
the holding member has a holding body that holds the basic busbar module for each of the plurality of busbars, each of the holding bodies is arranged side by side in an arrangement direction of the busbars,
the holding body has an insertion portion into which the busbar is inserted, and a holding portion that is engaged with the busbar during an insertion into the insertion portion and holds the busbar,
the insertion portion is provided at each of both ends in the arrangement direction of the holding bodies,
each of the insertion portions is formed such that two corner portions in the arrangement direction of the busbar are respectively inserted into the insertion portions, and
the holding portion of the holding body has a claw portion that is inserted into a locking hole of the busbar in a state where an end portion of the busbar in a direction perpendicular to the arrangement direction is inserted into the insertion portion.

2. The busbar module according to claim 1, wherein
the holding member has an insulating cover body that covers the busbar on the battery module after being assembled to the battery module together with the basic busbar module.

3. The busbar module according to claim 2, wherein
the holding member has a hinge portion between the holding body and the insulating cover body, and
the hinge portion is formed to change a position of the insulating cover body with respect to the holding body between a position where work of connection between the busbar and the electrode terminal is not impeded and a position where the busbar on the battery module is covered.

4. The busbar module according to claim 3, wherein
the holding member is provided with a lock mechanism that holds a closed state of the insulating cover body with respect to the holding body capable of covering the busbar on the battery module, and
the lock mechanism includes a first locking portion provided on the holding body side, and a second locking portion that is provided on the insulating cover body side and holds the closed state by being locked to the first locking portion.

5. The busbar module according to claim 4, wherein
the basic busbar module is provided for each of sections of the electrode terminal group, and
in the holding member, the holding body is formed to collectively hold a plurality of the basic busbar modules.

6. The busbar module according to claim 3, wherein
the basic busbar module is provided for each of sections of the electrode terminal group, and
in the holding member, the holding body is formed to collectively hold a plurality of the basic busbar modules.

7. The busbar module according to claim 2, wherein
the holding member is provided with a lock mechanism that holds a closed state of the insulating cover body with respect to the holding body capable of covering the busbar on the battery module, and
the lock mechanism includes a first locking portion provided on the holding body side, and a second locking portion that is provided on the insulating cover body side and holds the closed state by being locked to the first locking portion.

8. The busbar module according to claim 7, wherein
the basic busbar module is provided for each of sections of the electrode terminal group, and
in the holding member, the holding body is formed to collectively hold a plurality of the basic busbar modules.

9. The busbar module according to claim 2, wherein
the basic busbar module is provided for each of sections of the electrode terminal group, and
in the holding member, the holding body is formed to collectively hold a plurality of the basic busbar modules.

10. The busbar module according to claim 1, wherein
the basic busbar module is provided for each of sections of the electrode terminal group, and
in the holding member, the holding body is formed to collectively hold a plurality of the basic busbar modules.

11. A battery pack comprising:
a battery module including a plurality of battery cells; and
a busbar module that electrically connects the plurality of battery cells in series or in parallel, wherein
the busbar module includes a basic busbar module assembled to an electrode terminal group arranged in a row of the battery module, and a holding member that holds the basic busbar module,
the basic busbar module includes:
   a plurality of busbars that is arranged along an arrangement direction of respective electrode terminals of the electrode terminal group and is electrically connected to the corresponding electrode terminals; and
   a flexible flat conductor having a conductor portion that is electrically connected to the plurality of busbars, and an insulating holding portion that holds the plurality of busbars, the holding member has a holding body that holds the basic busbar module for each of the plurality of busbars, each of the holding bodies is arranged side by side in an arrangement direction of the busbars, the holding body has an insertion portion into which the busbar is inserted, and a holding portion that is engaged with the busbar during an insertion into the insertion portion and holds the busbar, the insertion portion is provided at each of both ends in the arrangement direction of the holding bodies, each of the insertion portions is formed such that two corner portions in the arrangement direction of the busbar are respectively inserted into the insertion portions, and the holding portion of the holding body has a claw portion that is inserted into a locking hole of the busbar in a state where an end portion of the busbar in a direction perpendicular to the arrangement direction is inserted into the insertion portion.

* * * * *